US012676072B2

(12) United States Patent
Drucker et al.

(10) Patent No.: US 12,676,072 B2
(45) Date of Patent: Jul. 7, 2026

(54) SYSTEMS AND METHODS TO NAVIGATE UNMANNED VEHICLES BASED ON DATA PROCESSING OF FLIGHT PLANS

(71) Applicant: DroneUp, LLC, Virginia Beach, VA (US)

(72) Inventors: Therese Rose Drucker, Chesapeake, VA (US); Remigiusz Zajac, Wroclaw (PL)

(73) Assignee: DroneUp, LLC, Virginia Beach, VA (US)

( * ) Notice: Subject to any disclaimer, the term of this patent is extended or adjusted under 35 U.S.C. 154(b) by 51 days.

(21) Appl. No.: 18/616,311

(22) Filed: Mar. 26, 2024

(65) Prior Publication Data

US 2025/0308391 A1 Oct. 2, 2025

(51) Int. Cl.

*G08G 5/34* (2025.01)
*G08G 5/26* (2025.01)
*G08G 5/55* (2025.01)
*G08G 5/57* (2025.01)
*G08G 5/59* (2025.01)
*G08G 5/80* (2025.01)

(52) U.S. Cl.

CPC ................ *G08G 5/34* (2025.01); *G08G 5/26* (2025.01); *G08G 5/55* (2025.01); *G08G 5/57* (2025.01); *G08G 5/59* (2025.01); *G08G 5/80* (2025.01)

(58) Field of Classification Search

None

See application file for complete search history.

(56) References Cited

U.S. PATENT DOCUMENTS

| | | | | |
|---|---|---|---|---|
| 6,421,603 | B1 * | 7/2002 | Pratt | G08G 5/32 244/175 |
| 9,256,225 | B2 | 2/2016 | Downey et al. | |
| 9,256,994 | B2 | 2/2016 | Downey et al. | |
| 2010/0228468 | A1 * | 9/2010 | D'Angelo | G08G 5/25 701/120 |
| 2017/0046962 | A1 * | 2/2017 | Shipley | G08G 5/30 |
| 2017/0372617 | A1 | 12/2017 | Bruno et al. | |
| 2018/0068569 | A1 * | 3/2018 | Chmelarova | G08G 5/58 |
| 2019/0012925 | A1 | 1/2019 | Barker | |
| 2020/0043350 | A1 * | 2/2020 | Cantrell | G08G 5/32 |

(Continued)

FOREIGN PATENT DOCUMENTS

WO WO 01/22034 A2 3/2001

OTHER PUBLICATIONS

International Search Report and Written Opinion for PCT Application No. PCT/US2025/021233 mailed Jun. 18, 2025, 11 pages.

(Continued)

*Primary Examiner* — Madison R. Inserra
(74) *Attorney, Agent, or Firm* — Cooley LLP

(57) ABSTRACT

In an embodiment, a method includes receiving, at a compute device of a unmanned aerial vehicle (UAV) that is included within a plurality of unmanned aerial vehicles (UAVs) associated with a site, a representation of a flight plan (1) between a start location at a start time and an end location at an end time, and (2) for the UAV. The method further includes causing the UAV to autonomously fly based on the flight plan for the UAV in response to the UAV receiving the signal with the representation of the flight plan for the UAV.

21 Claims, 15 Drawing Sheets

(56) References Cited

U.S. PATENT DOCUMENTS

| | | | | |
|---|---|---|---|---|
| 2023/0237917 | A1 * | 7/2023 | Schuppenhauer ....... | G08G 5/26 701/120 |
| 2023/0306355 | A1 | 9/2023 | Mehta et al. | |
| 2024/0005802 | A1 | 1/2024 | Meng et al. | |

OTHER PUBLICATIONS

Besada, J. A. et al., "Drone Mission Definition and Implementation for Automated Infrastructure Inspection Using Airborne Sensors," Sensors, 18:1170 (2018); doi:10.3390/s18041170, 29 pages.

Kingston, D. B. et al., "Autonomous Vehicle Technologies for Small Fixed Wing UAVs," Journal of Aerospace Computing, Information, and Communication, vol. 2, No. 1 (2005), pp. 92-108; doi:10.2514/1.8371, 11 pages.

Tomczyk, A., "In-flight tests of navigation and control system of unmanned aerial vehicle," Aircraft Engineering and Aerospace Technology, 2003, https://www.academia.edu/21522524/In_flight_tests_of_navigation_and_control_system_of_unmanned_aerial_vehicle?uc-g-sw=35443563, 16 pages.

* cited by examiner

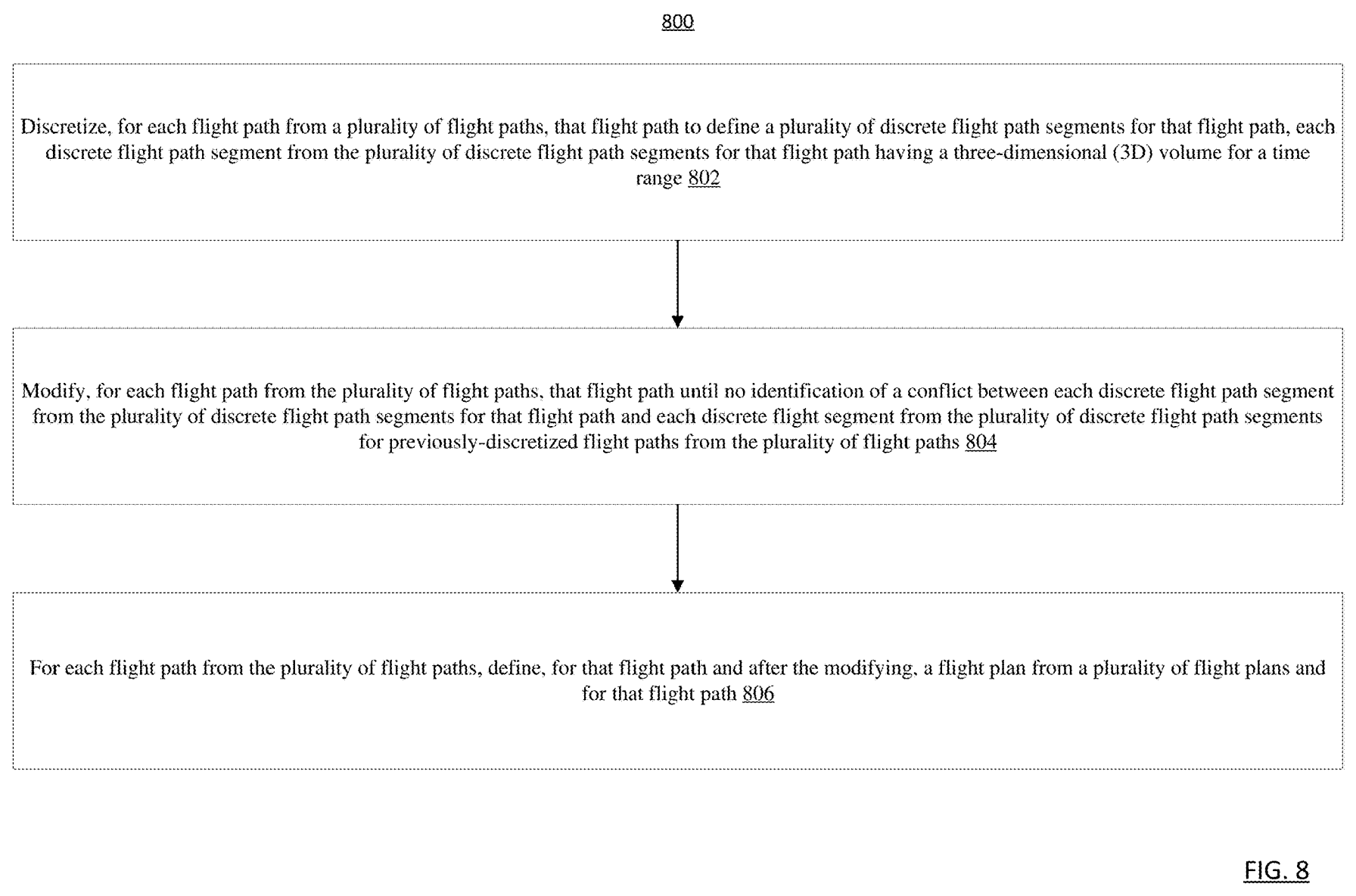

800

Discretize, for each flight path from a plurality of flight paths, that flight path to define a plurality of discrete flight path segments for that flight path, each discrete flight path segment from the plurality of discrete flight path segments for that flight path having a three-dimensional (3D) volume for a time range 802

↓

Modify, for each flight path from the plurality of flight paths, that flight path until no identification of a conflict between each discrete flight path segment from the plurality of discrete flight path segments for that flight path and each discrete flight segment from the plurality of discrete flight path segments for previously-discretized flight paths from the plurality of flight paths 804

↓

For each flight path from the plurality of flight paths, define, for that flight path and after the modifying, a flight plan from a plurality of flight plans and for that flight path 806

FIG. 8

SYSTEMS AND METHODS TO NAVIGATE UNMANNED VEHICLES BASED ON DATA PROCESSING OF FLIGHT PLANS

FIELD

One or more embodiments are related to systems and methods to navigate unmanned vehicles based on data processing of flight plans.

BACKGROUND

As unmanned vehicles (UVs) operate, such as autonomous unmanned aerial vehicles (UAVs), it can be desirable to avoid UVs from colliding with other UVs. Paths for the UVs to take during transit can be planned before transit, but plans may sometimes conflict with one another such that two different UVs may be in the same space at the same time. Accordingly, as the number of, for example, flights by UAVs grow and operational deadlines get less negotiable, it can be desirable for flight planning software to produce more tightly knit lattices of flight intents that avoid two or more UVs at the same location in space and time.

SUMMARY

In an embodiment, a non-transitory processor-readable medium stores code representing instructions to be executed by a processor. The instructions comprise code to cause the processor to, for each flight path from a plurality of flight paths, discretize that flight path to define a plurality of discrete flight path segments for that flight path. Each discrete flight path segment from the plurality of discrete flight path segments for that flight path represents a three-dimensional (3D) volume with a girth related to a size of an unmanned aerial vehicle (UAV) for that flight path and an accuracy of a positioning system of the UAV for that flight path. Each discrete flight path segment from the plurality of discrete flight path segments for that flight path represents a time range indicating when the UAV is expected to pass that discrete flight path segment. The instructions further comprise code to cause the processor to, for each flight path from the plurality of flight paths, compare each discrete flight path segment from the plurality of discrete flight path segments for that flight path to each discrete flight path segment from the plurality of discrete flight path segments for previously-discretized flight paths from the plurality of flight paths until (1) identification of a conflict between a discrete flight segment from the plurality of discrete flight segments for that flight path and a discrete flight segment from the plurality of discrete flight segments for the previously-discretized flight paths from the plurality of flight paths, or (2) completion with no identification of the conflict. The instructions further comprise code to cause the processor to, for each flight path from the plurality of flight paths, in response to the identification of the conflict, modifying that flight path until no identification of a conflict between each discrete flight path segment from the plurality of discrete flight path segments for that flight path and each discrete flight segment from the plurality of discrete flight path segments for previously-discretized flight paths from the plurality of flight paths. The instructions further comprise code to cause the processor to, for each flight path from the plurality of flight paths, in response to no identification of the conflict, define, for that flight path, a flight plan from a plurality of flight plans.

In an embodiment, a method includes receiving, at a compute device of a first unmanned aerial vehicle (UAV) that is included within a plurality of unmanned aerial vehicles (UAVs) associated with a site, a representation of a flight plan (1) between a start location at a start time and an end location at an end time, and (2) for the first UAV. The flight plan for the first UAV is associated with a non-linear flight path having a plurality of discrete flight segments. Each discrete flight path segment from the plurality of discrete flight path segments for the first UAV represents a three-dimensional (3D) volume with a girth related to a size of the first UAV and an accuracy of a positioning system of the first UAV. Each discrete flight path segment from the plurality of discrete flight path segments for that flight path represents a time range indicating when is the UAV is expected to pass that discrete flight path segment. At least one discrete flight path segment from the plurality of discrete flight path segments for the second UAV has been modified until no identification of a conflict between each discrete flight path segment from the plurality of discrete flight path segments for the second UAV. The method further includes causing the first UAV to autonomously fly based on the flight plan for the first UAV in response to the first UAV receiving the signal with the representation of the flight plan for the first UAV.

In an embodiment, an apparatus includes a processor and a memory coupled to the processor. The memory stores code that when executed by the processor cause the processor to, for each flight path from a plurality of flight paths, discretize that flight path to define a plurality of discrete flight path segments for that flight path. Each discrete flight path segment from the plurality of discrete flight path segments for that flight path has a three-dimensional (3D) volume for a time range. The memory stores code that when executed by the processor cause the processor to, for each flight path from a plurality of flight paths, modify that flight path until no identification of a conflict between each discrete flight path segment from the plurality of discrete flight path segments for that flight path and each discrete flight segment from the plurality of discrete flight path segments for previously-discretized flight paths from the plurality of flight paths. The memory stores code that when executed by the processor cause the processor to, for each flight path from a plurality of flight paths, define, for that flight path and after the modifying, a flight plan from a plurality of flight plans and for that flight path.

BRIEF DESCRIPTION OF THE FIGURES

FIG. 8 shows a flowchart of a method to generate flight plans for flight paths based on discretized flight path segments, according to an embodiment.

DETAILED DESCRIPTION

Figure 1:
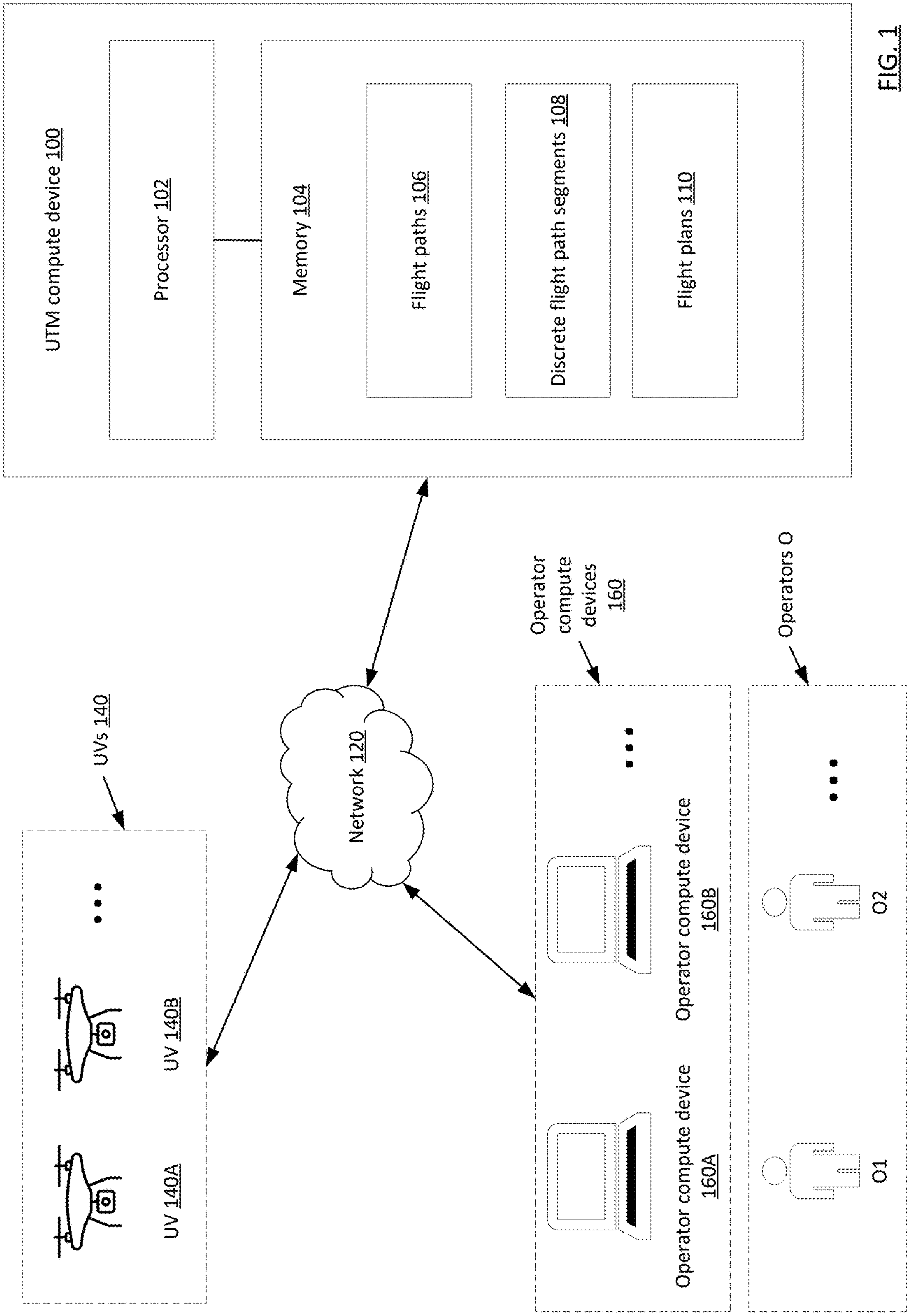
FIG. 1 shows a system block diagram of a flight plan generation system for generating flight plans for unmanned vehicles (UVs), according to an embodiment.

Some implementations are related to determining flight plans for multiple unmanned vehicles (UVs). Multiple UVs may operate in a given geographic area, and it can be desirable for those UVs to operate without colliding into other UVs. Thus, some implementations are related to iteratively generating flight paths, discretizing flight paths into segments, and comparing those segments to other segments (e.g., from previously generated flight paths) until all conflicts are resolved to generate flight plans. For example, after a first flight path has been generated that does not conflict, discretized flight path segments from the first flight path can be compared to discretized flight path segments from a second flight path. If a discrete flight path segment from the first flight path conflicts with a discrete flight path segment from the second flight path, the second flight path (e.g., and not the first flight path) can be modified to resolve the conflict. Such a process can continue for any number of flight paths, where a subsequent flight path is discretized and compared to discrete flight path segments from previous flight paths; if a conflict exists, that subsequent flight path (e.g., and not previous flight paths) is modified to resolve the conflict.

In some implementations, a "flight path" refers to an initial flight path that is under consideration for a UV to take but the UV has not yet taken. In some implementations, a "flight path" is a predefined pathway(s) for airway routing of an UAV.

In some implementations, a "flight plan" refers to an actual path that a UV is to and/or eventually does take. A flight plan can include, for example, a flight path (e.g., after the flight path is determined to not conflict). Additionally, in some implementations, a flight plan includes other information associated with the flight path such as departure and arrival points, estimated time en route, alternative landing locations in case of bad weather, operator information, cargo delivered or services performed by the vehicle, information identifying the vehicle itself (e.g., make, model, serial number, etc.), and/or the like. The services performed by vehicle can include, for example, a security surveillance to capture photos or videos.

Some implementations described herein generate flight plans for UVs without human intervention. For example, flight paths can be generated without human intervention, discrete flight path segments can be generated without human intervention based on the flight paths, flight plans can be generated without human intervention based on discrete flight path segments, UVs can execute flight plans without human intervention, and/or the like. By managing without human intervention all or parts of an UV's operation, at least some techniques described herein can be performed in real-time (e.g., at machine speed) and faster than if, for example, human intervention was involved; this can be useful in use cases where UVs are used to perform missions that are time sensitive, require confidentiality, where UV operations are performed at large scale (e.g., where the number of UVs is very large), where human resources are sparse (e.g., where the number of UVs greatly outnumber the qualified operators), and/or the like.

In other implementations, however, there can be human intervention, such as refraining from beginning an action until a human provides an indication to do so or using human input to modify input and/or output data. For example, flight paths can be generated with human intervention, discrete flight path segments can be generated with human intervention based on the flight paths, flight plans can be generated with human intervention based on discrete flight path segments, UVs can execute flight plans with human intervention, and/or the like.

In some implementations, techniques described herein are related to remotely generating flight paths, discrete flight path segments, and/or flight plans. In some use cases, it can be desirable for UVs to be compact and/or light. By generating flight paths, discrete flight path segments, and/or flight plans using compute devices remote from the UVs and offloading the hardware burden of UVs to the remote compute devices, the UV can be made more compact and/or light. Additionally, having a remote compute device(s) generate flight plans, discrete flight path segments, and/or flight plans instead of each UV can be desirable in at least some use cases because the remote compute device(s) can generate and share indications of the flight plans, discrete flight path segments, and/or flight plans to UVs, rather than having each UV share respective flight plans, discrete flight path segments, and/or flight plans with each other.

In some implementations, techniques described herein are related to assigning flight plans to UVs so that the UVs will not collide with other UVs. This can facilitate more efficient UV traffic and avoid, for example, a collision between UVs. Additionally, some techniques described herein can be applied to unmanned aerial vehicles (UAVs). Generating flight plans for aerial vehicles may be different from generating flight plans for, for example, a ground vehicle in that the latter usually can only move along two-dimensional surfaces (e.g., along x and y axes) while the former can move along three dimensions (e.g., x, y, and z axes). Note, however, that although some implementations are discussed with reference to UAVs and flight, in other implementations, techniques described herein can also be applied to non-UAVs, such as ground UVs or water UVs.

FIG. 1 shows a system block diagram of a flight plan generation system for generating flight plans for unmanned vehicles (UVs), according to an embodiment. FIG. 1 includes unmanned aircraft system traffic management (UTM) compute device 100, UVs 140, and operator compute devices 160, each communicatively coupled to one another via network 120.

Network 120 can be any suitable communications network for transferring data, operating over public and/or private networks. For example, a network can include a private network, a Virtual Private Network (VPN), a Multiprotocol Label Switching (MPLS) circuit, the Internet, an intranet, a local area network (LAN), a wide area network (WAN), a metropolitan area network (MAN), a worldwide interoperability for microwave access network (WiMAX®), an optical fiber (or fiber optic)-based network, a Bluetooth® network, a virtual network, and/or any combination thereof. In some instances, network 120 can be a wireless network such as, for example, a Wi-Fi® or wireless local area network ("WLAN"), a wireless wide area network ("WWAN"), and/or a cellular network. In other instances, network 120 can be a wired network such as, for example, an Ethernet network, a digital subscription line ("DSL") network, a broadband network, and/or a fiber-optic network. In some instances, the network 120 can use Application Programming Interfaces (APIs) and/or data interchange formats (e.g., Representational State Transfer (REST), JavaScript Object Notation (JSON), Extensible Markup Language (XML), Simple Object Access Protocol (SOAP), and/or Java Message Service (JMS)). The communications sent via the network 120 can be encrypted or unencrypted. In some instances, network 120 can include multiple networks or subnetworks operatively coupled to one another by, for example, network bridges, routers, switches, gateways and/or the like.

In some implementations, network 120 is a private network. Thus, for example, only certain devices (such as UTM compute device 100, operator compute devices 160, UVs 140, and/or any intermediate compute devices connected therebetween) with access to network 120 can communicate via network 120. Using a private network can provide more security for, for example, controlling UVs 140. Since missions can often be critical, using a private network can prevent undesirable cyber-attacks.

Operator compute devices 160 can include any number of operator compute devices, such as operator compute devices 160A, 160B, and/or the like. Each operator compute device from operator compute devices 160 can be any type of compute device, such as a server, desktop, laptop, tablet, phone, and/or the like. In some implementations, an operator compute device from operator compute devices 160 is a mobile device having a smaller screen, processing capability, memory capability, and/or the like compared to, for example, a tablet, laptop, desktop, or server. Each operator compute device from operator compute devices 160 can include a processor operatively coupled to a memory (e.g., via a system bus). For example, operator compute device 160A includes a processor (not shown in FIG. 1) operatively coupled to a memory (not shown in FIG. 1), operator compute device 160B includes a processor (not shown in FIG. 1) operatively coupled to a memory (not shown in FIG. 1).

Each operator compute device from operator compute devices 160 can be associated with (e.g., owned by, leased to, accessible by, in the name of, used by, etc.) an operator from operators O. Each operator from operators O can remotely manage and/or be tasked with remotely managing operation of one or more (e.g., multiple) UVs from UVs 140 assigned to that operator. The operator could be, for example, a drone pilot, solider, surveyor, air traffic controller and/or the like. For example, operator compute device 160A can be associated with operator O1 and operator compute device 160B can be associated with operator O2.

UVs 140 can include any number of UVs, such as UVs 140A, 140B, and/or the like. In some implementations, UVs 140 are unmanned (e.g., no human is aboard the UV). In some implementations, UVs 140 are operated by one or more operators via one or more operator compute devices from operator compute devices 120. For example, UV 140A can be controlled by operator O1 via operator compute device 160A over network 140, UV 140B can be controlled by operator O2 via operator compute device 120B over network 140, and/or the like. In some implementations, UVs 140 is associated with one or more sites (e.g., a single common site, multiple sites). For example, UV 140A may be assigned to perform a mission at a site and UV 140B may be assigned to perform a different mission within the same site. Where multiple UVs are to perform missions within the same site, it can be desirable to avoid those UVs from colliding and/or getting too close to each other during transit. A site can refer to any geographic area, such as a building, neighbor, city, district, body of water, and/or the like.

UVs 140 can include any type of UV, such as an aerial UV, water UV, or ground UV. Examples of UVs 140 include semi-autonomous cars, manual cars, radio-controlled carts, radio-controlled aircraft, unmanned combat aerial vehicles, medium-altitude long-endurance unmanned aerial vehicles, miniature unmanned aerial vehicle (UAVs), delivery drones, micro air vehicles, target drones, spaceport drone ships, surface drones, underwater vehicles, uncrewed spacecrafts, and/or the like. In some implementations, each UV in UVs 140 is a UAV. The control of an UV by an operator can be, for example, full control (e.g., for a UV with no autonomy), partial control (e.g., for a UV with partial autonomy, and/or no autonomy during certain periods of time) and supervisory control (e.g., for a UV with a high level of autonomy that can be overtaken by the operator in certain situations such as emergency situations).

Although not explicitly shown in FIG. 1, each UV in UVs 140 can include a processor and memory. In some implementations, each UV in UVs 140 includes a camera and/or other sensors to track that UV's surroundings for consideration by the operator when operating that UV. In some implementations, UVs in UVs 140 have limited processing and/or memory capability due to, for example, a low weight design (or requirement), a compact size design (or requirement), and/or the like, and thus are operated remotely by one or more operator compute devices from operator compute devices 120.

UTM compute device 100 can be any type of compute device, such as a server, desktop, laptop, tablet, phone, and/or the like. UTM compute device 100 includes processor 102 operatively coupled to memory 104 (e.g., via a system bus).

Memory 104 can include (e.g., store) a representation of flight paths 106. Flight paths 106 can include a representation(s) of one or more (e.g., multiple) flight paths. In some implementations, a flight path refers to a planned and/or assigned course/route/path for a UV from UVs 140 to take to, for example, execute a mission. For example, if a mission is for UV 140A to deliver an item from a first location to a second location by air, the flight path can indicate the path that UV 140A can take to get from the first location to the second location. As another example, if a mission is for UV 140B to deliver an item from the first location to a third location by air, the flight path can indicate the path that UV 140B can take to get from the first location to the third location.

In some implementations, a flight path is generated by determining a best path, which can be based on various factors that contribute to the lowest (or lower) risk such as a shortest path (e.g., to achieve the minimal length of travel), fastest path (e.g., to achieve the minimal time of travel), optimal path (e.g., to achieve a combination of the minimal length of travel and the minimal time of travel), and energy expended. The shortest path (e.g., using Dijkstra's algorithm, the Bellman-ford algorithm, the A* algorithm, the breadth-first search, the fast marching method, and/or the like) can be between a start location and an end location/destination and based on available and/or preferred pathways (e.g., operate above highways if possible, avoid restricted air space, avoid flight over houses is possible, avoid windy areas if possible, avoid areas with spotty network coverage, etc.). In some implementations, the flight path is generated by determining a best path, which can be based on various factors such as a shortest path between a start location and an end location/destination and based on available and/or preferred pathways without using a machine learning model.

In some implementations, a flight path is generated using a machine learning model. For example, a neural network can be trained using input parameters (e.g., start location, end location, UV to be used, site details, weather conditions, time, etc.) as input training data and flight paths as output training data. Once trained, the machine learning model can be configured to receive input parameters associated with a mission and output a representation of a flight path for the mission.

In some implementations, each flight path from flight paths 106 represents the time and a three-dimensional space that a UV might be within during that flight path. Said differently, each flight path from flight paths 106 can account for the worst-case flight scenario (e.g., similar to a worst-case circuit analysis but for a UV's flight path), best-case flight scenario, and everything in between. Each flight path from flight paths 106 can be large enough to account for potential variability due to, for example, weather conditions (including, for example, winds such as head winds or tail winds), starting a flight later or earlier, UV performance, traffic, operator errors, and/or the like.

In some implementations, each flight path from flight paths 106 can be thought of in four dimensions—three-dimensional space plus time (e.g., two-dimensional space plus the girth/size of the UV plus time). Said differently, for each flight path from flight paths 106, that flight path can include representation of a three-dimension volume that a UV for that flight path will be within a time t, representation of a three-dimension volume that the UV will be within a time t+1, representation of a three-dimension volume that the UV will be within a time t+2, and so on until a flight path is complete. In some implementations, the four-dimensional volume for each flight path from flight paths 106 can be large enough so that a confidence the UV will be/follow the four-dimensional volume (i.e., be somewhere within the flight path) is above a predetermined threshold (e.g., 100% confident, 99% confident, 98% confident, and/or the like). A flight path can represent, for example, a line string until the flight path has been discretized.

In some implementations, each flight path from flight paths 106 is associated with (e.g., assigned, scheduled, etc.) a start time for the UV associated with that flight path to begin that flight path. For example, UV 140A may be assigned a first flight path from flight paths 106 to deliver an item from a first location to a second location, and the first flight path can be scheduled to begin at 2 PM EST on Jan. 1, 2025. As another example, UV 140B may be assigned a second flight path from flight paths 106 to deliver an item from the second location to a third location, and the second flight path can be scheduled to being at 2:10 PM EST on Jan. 1, 2025.

Memory 104 can also include (e.g., store) a representation of discrete flight path segments 108. In some implementations, discrete flight path segments 108 can be generated by discretizing each flight path from flight paths 106 into segments (e.g., based on distances and/or times). For example, a first flight path from flight paths 106 can be discretized to a first set of discrete flight path segments included in discrete flight path segments 108, a second flight path from flight paths 106 can be discretized to a second set of discrete flight path segments included in discrete flight path segments 108, and/or the like.

For each flight path from flight paths 106, each discrete flight path segment from discrete flight path segments 108 for that flight path can represent a three-dimensional (3D) volume with a girth (e.g., circumference around the x-y plane) related to a size of a UV (from UVs 140) for that flight path and/or an accuracy of a positioning system of the UV for that flight path, where the 3D volume indicates a range of possible locations the UV can be at a given time. In some implementations, the size of each discrete flight path segment is related to the girth of the UV in that the size of the discrete flight path segment is large enough to account for size of the UV and the possible variability of the UV's location (e.g., due to weather, due to UV performance, etc.). In some implementations, each discrete flight path segment is also large enough to account for variability of the accuracy of a positioning system of the UV (e.g., a global positioning system in the UV may be accurate with 5% margin for error). In some implementations, for each flight path from flight paths 106 and before discretizing, a size of the 3D volume for each discrete flight path segment from the plurality of flight path segments can be overestimated (e.g., made larger, create a buffer) based on a performance envelope (e.g., bank angles, horizontal and vertical speeds, etc.) for the UV for that flight path that is based on at least one of (1) a weather associated with the UV for that flight path (e.g., wind, rain, visibility, temperature, etc.), (2) a vehicle configuration (e.g., size/girth, weight, accuracy of positioning system, etc.) for the UV for that flight path, (3) an accuracy of a measurement device associated with the UAV, (4) a type of cargo of the UAV, (5) a time buffer associated with each discrete flight segment from the plurality of discrete flight segments, and/or (6) historical data associated with performance of the UAV. Each discrete flight path segment from discrete flight path segments 108 for that flight path can also represent a time range indicating when the UV is expected to pass that discrete flight path segment.

In some implementations, each discrete flight path segment from discrete flight path segments 108 indicates, for the UV associated with the flight path used to generate that discrete flight path segment, a location range where the UV will be at a given time range if the flight path is taken (sometimes referred to herein as a "slot"). For example, a flight path from flight paths 106 that UV 140A is under consideration to take can be discretized into multiple discrete flight path segments (i.e., slots), and each of those discrete flight path segments can indicate where UV 140A will be located at a given time if the flight path is taken; this indication of location and time can be approximations/ranges (e.g., to account for potential variations and/or errors).

In some implementations, each flight path from flight paths 106 can be discretized to generate the same number of discrete flight path segments. For example, a first flight path from flight paths 106 can discretized to generate X (where X can be any number, such as two, 10, 100, 1000, and/or the like) discrete flight path segments from that first flight path, a second flight path from flight paths 106 can discretized to generate X discrete flight path segments from that second flight path, a third flight path from flight paths 106 can discretized to generate X discrete flight path segments from that third flight path, and so on such that each flight path from flight paths 106 is discretized to generate X discrete flight path segments from that flight path.

In some implementations, each flight path from flight paths 106 can be discretized to generate discrete flight path segments that are of substantially (e.g., within 1%, within 10%, within 25%, and/or the like) the same duration (e.g., 30 seconds long, 1 minute long, two minutes long, five minutes long, 10 minutes long, and/or the like). For example, a first flight path from flight paths 106 can discretized to generate discrete flight path segments from that first flight path that are all Y minutes long (where Y can be any duration), a second flight path from flight paths 106 can discretized to generate discrete flight path segments from that second flight path that are all Y minutes long, a third flight path from flight paths 106 can discretized to generate discrete flight path segments from that third flight path that are all Y minutes long, and so on such that each flight path from flight paths 106 is discretized to generate discrete flight path segments from that flight path that are Y minutes long.

In some implementations, each flight path from flight paths 106 can be discretized to generate discrete flight path segments that are of substantially (e.g., within 1%, within 10%, within 25%, and/or the like) the same distance (e.g., 100 meters long, one mile long, one kilometer long, and/or the like). For example, a first flight path from flight paths 106 can discretized to generate discrete flight path segments from that first flight path that are all Z meters long (where Z can be any length), a second flight path from flight paths 106 can discretized to generate discrete flight path segments from that second flight path that are all Z meters long, a third flight path from flight paths 106 can discretized to generate discrete flight path segments from that third flight path that are all Z meters long, and so on such that each flight path from flight paths 106 is discretized to generate discrete flight path segments from that flight path that are Z meters long.

In some implementations, at least one discrete flight path segment from discrete flight path segments 108 for a flight path from flight paths 106 has a duration and/or a distance different from a duration and a distance of at least one (e.g., all) remaining discrete flight path segments from discrete flight path segments 108 for the flight path. In some implementations, for example, the distance and/or durations associated with discrete flight path segments can increase (e.g., to accommodate for uncertainty) as a UV travels further from a start location and/or as more time elapses as the UV is travelling/in transit.

Accordingly, each discrete flight path segment from discrete flight path segments 108 can indicate (approximately) where a UV will be at a given time. Thus, discrete flight path segments from discrete flight path segments 108 can be compared to one another (e.g., to the discrete flight path segments from previously-discretized flight paths) to determine if a conflict exists. In some implementations, a conflict can refer to the predicted location and time for a first UV overlapping at least partially with the predicted location and time for a second UV from a previously assigned/designated/planned discretized flight path(s). Note, however, that in this context "conflict" does not refer to an actual collision between UVs because a flight path is a planned flight but not yet an executed or executing flight. If a conflict exists, a flight path(s) that is in conflict can be modified by, for example, changing that flight path(s) so that the conflict is removed/avoided (e.g., using a minimum cost function). For example, if UV 140A is predicted to be within a first volume during a time range (as represented by a first discrete flight path segment) and UV 140B is then predicted to be within a second volume that overlaps at least partially with the first volume during the same time range (as represented by a second discrete flight path segment), a conflict can exist between the flight paths for UVs 140A and 140B. In response, the flight path for UV 140B (e.g., and not for UV 140A) can be modified, such as having UV 140B be within the second volume during a different time range, UV 140B be within a fourth volume that does not overlap with the first volume during the time range, and/or the like. The aforementioned process of identifying conflicts and modifying flight paths to resolve conflicts can continue for any number of flight paths and until no conflicts exists.

In some implementations, if a first flight path from flight paths 106 is determined to conflict with a previous flight path from flight paths 106, the first flight path is deleted from and/or not saved as part of flight paths 106. Deleting flight paths from flight paths 106 that are in conflict can save space for memory 104, as well as reduce the number of flight paths that subsequent flight paths are compared to for determining whether a conflict exists.

Memory 104 can also include (e.g., store) a representation of flight plans 110. Flight plans 110 can indicate final flight paths after conflicts have been resolved. Said differently, each flight plan from flight plans 110 can represent the actual path that a UV is to take and/or eventually takes. Flight plans 110 can include flight paths from flight paths 106 that do not conflict. For example, UV 140A may have been planned to take a first flight path from flight paths 106 and UV 140B may, after the first flight path has been determined, have been initially planned to take a second flight path from flight paths 106. After determining a conflict based on discrete flight path segments generated using the first and second flight paths, however, UV 140B's flight was modified to resolve the conflict and generate a different, third flight path (and, in some implementations, delete the second flight path). Assuming the first and third flight paths do not conflict with any other flight paths from flight paths 106, a representation of the first and third flight paths can be included flight plans 110.

In some implementations, each flight plan from flight plans 110 includes, in addition to a flight path that is to be taken, indication of information such as departure and arrival points, estimated time en route, alternative landing locations in case of bad weather (or UAV failure), operator information, cargo delivered or services performed by the vehicle, information about the vehicle itself (e.g., make, model, serial number, etc.), and/or the like. This other information may be, for example, provided by a human (e.g., operator, user requesting the mission, etc.) and/or generated by a software model. The services performed by vehicle can include, for example, a security surveillance to capture photos or videos.

After flight plans 110 have been generated, in some implementations, a representation of flight plans 110 can be sent to operator compute devices 160. In some implementations, a given flight plan can be received at the associated operator compute device when and/or before that flight plan is scheduled to begin. For example, data (e.g., electronic signals) can be sent from UTM compute device 100 to operator compute devices 160 via network 120, indicating flight paths 110. For example, if: operator O1 is to operate (e.g., monitor) a first mission using UV 140A, a representation of the flight path for the first mission can be sent from UTM compute device 100 to operator compute device 160A via network 120; operator O2 is to operate a second mission using UV 140B, a representation of the flight path for the second mission can be sent from UTM compute device 100 to operator compute device 160B via network 120; and/or the like.

In response to an operator compute device receiving an indication of a flight plan, the operator of the operator compute device can cause the flight plan to be executed. Causing the flight plan to be executed can include, for example, manually controlling a UAV throughout the entire flight plan, semi-manually controlling the UAV throughout parts of the flight plan while the UAV operates autonomously throughout the other parts of the flight plan, monitoring the UAV while the UAV autonomous executes the flight plan and only intervening as needed, and/or the like. In some implementations, missions and/or UVs are assigned to operators as discussed in U.S. patent application Ser. No. 18/393,368, filed Dec. 21, 2023 and titled "SYSTEMS AND METHODS TO EFFICIENTLY NAVIGATE UNMANNED VEHICLES", the contents of which are each incorporated by reference herein in their entirety.

Additionally or alternatively, in some implementations, a representation of the flight path for a given UV can be sent directly to that UV instead of an operator compute device. For example, if: a first mission is assigned UV 140A, a representation of the flight path for the first mission can be sent from UTM compute device 100 to UV 140A via network 120 without sending to operator compute devices 160; a second mission is assigned to UV 140B, a representation of the flight path for the second mission can be sent from UTM compute device 100 to UV 140B via network 120 without sending to operator compute devices 160; and/or the like. In response, each UV can operate at least semi-autonomously to follow the associated flight path.

Note that FIG. 1 is one example, and variations can exist. For example, in some implementations, operator compute devices 160 are not used; that is, flight plans can be generated and UVs can execute those flight plans without operator intervention or oversight. As another example, paths and/or plans don't have to be flight paths and/or flight plans, but can be any type of transit path and/or plan, such as a ground path, ground plan, boating path, boating plan, and/or the like.

Figure 2:
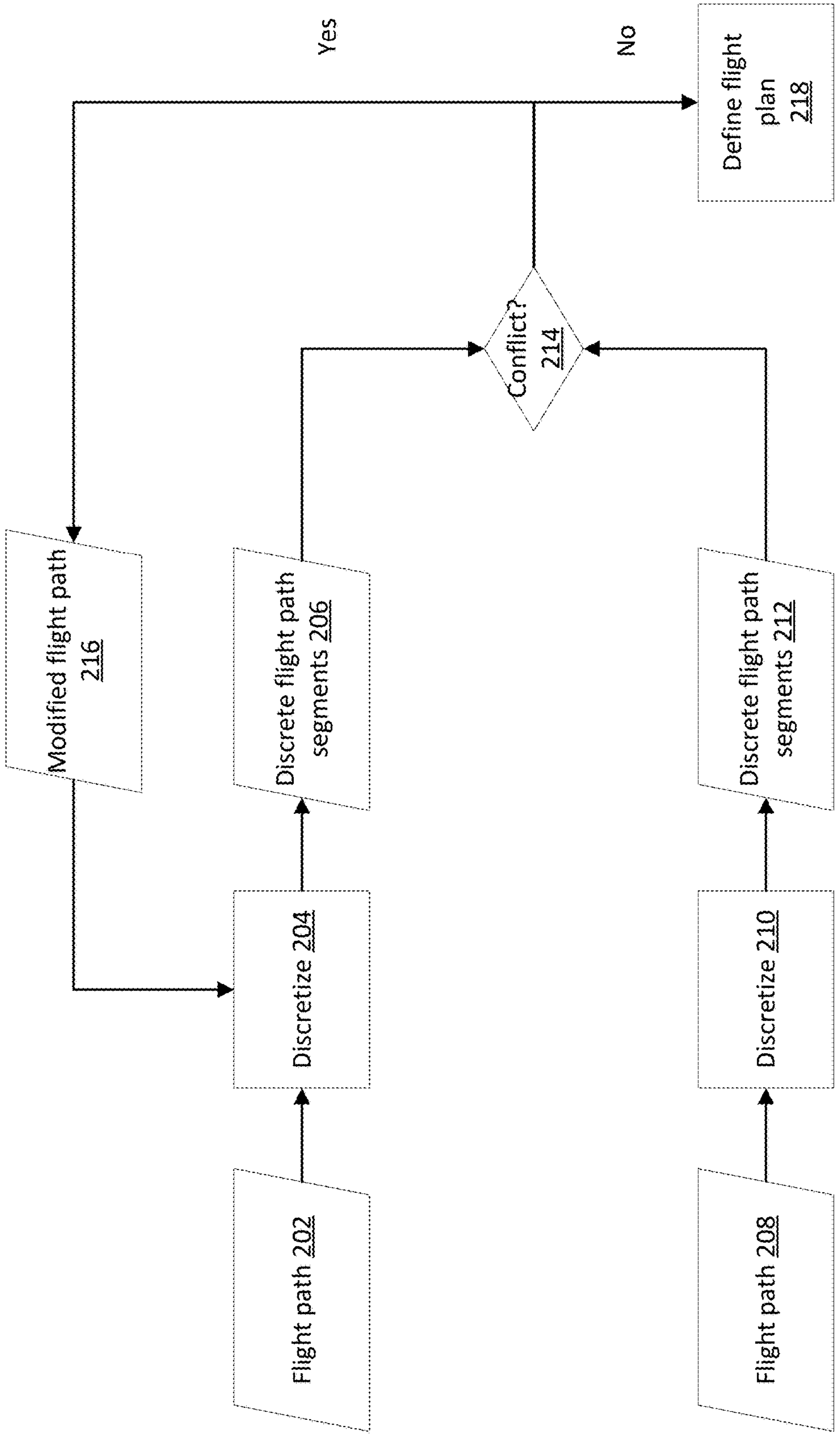
FIG. 2 shows a flowchart of a process to analyze flight paths for a conflict and define a flight plan, according to an embodiment.

FIG. 2 shows a flowchart of a process to analyze flight paths for a conflict and eventually define a flight plan, according to an embodiment. Flight path 202 can represent a first flight path for a first UV and be discretized at 204 to generate discrete flight path segments 206. Similarly, flight path 208, which can represent a second flight path different than the first flight path and for a second UV different than the first UV, can be discretized at 210 to generate discrete flight path segments 212. In some implementations, flight path 208 and/or discrete flight path segments 212 was generated before flight paths 202 and/or discrete flight path segments 206. Discrete flight path segments 206 can be compared to discrete flight path segments 212 to determine if there is a conflict at 214. If there is not a conflict, a flight plan can be defined at 218 that, for example, includes flight paths 202 and 208. If there is a conflict, however, flight path 202 can be modified to generate modified flight path 216, and the same process of discretizing and comparing discrete flight path segments can be repeated until a flight plan is defined.

Note that FIG. 2 is one example, and variations can exist. In some example, a flight paths can be compared to any other number of flight paths. For example, a flight path can be compared to tens or hundreds of other flight paths (e.g., instead of just one flight path), and modified until the flight path does not conflict with any of the tens or hundreds of other flight paths. As conflict-free flight paths are generated, subsequent flight paths can be compared to those conflict-flight paths and modified to avoid conflicting with those previously-generated conflict-free flight paths. For example, referring back to FIG. 2, if flight paths 202 and 208 are determined not to conflict, a third flight path (not shown in FIG. 2) can be compared to flight paths 202 and 208 for conflict and the third flight path can be modified if a conflict exists. Then, after resolving conflicts for the third flight path (if any), a fourth flight path (not shown in FIG. 2) can be compared to flight paths 202, 208 and the third flight path for conflict and the fourth flight path can be modified if a conflict exists.

Figure 3:
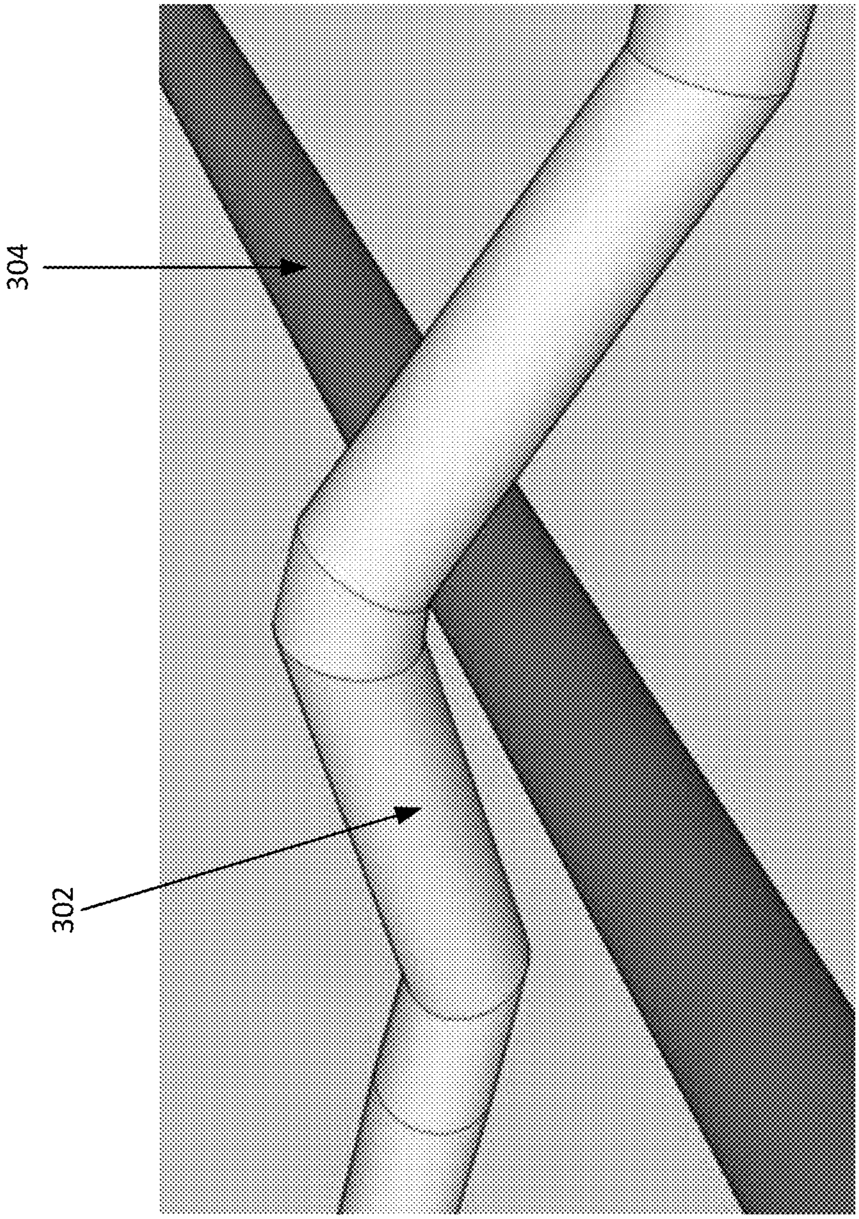
FIG. 3 illustrates an example of two flight paths, according to an embodiment.

FIG. 3 illustrates an example of two flight paths, according to an embodiment. FIG. 3 includes flight path 302 and flight path 304. Flight path 302 can represent a flight path for a first UV and flight path 304 can represent a flight path for a second UV. Flight path 302 can represent, over a period of time, a volume that the first UV would be within, and flight path 304 can represent, over the period of time, a volume that the second UV would be within. Flight paths 302 and 304 can each be large enough (e.g., overestimated, buffered) so account for variability, such as weather or UV performance. As shown in FIG. 3, flight paths 304 and 304 do not conflict because flight path 302 does not overlap anywhere with flight path 304. In some implementations, flight path 304 was generated, flight path 302 was generated thereafter but conflicted with flight path 304, and flight path 302 was modified to remedy the conflict.

FIGS. 4A-4F illustrate an example of discretizing flight paths, according to an embodiment. FIGS. 4A-4F are discussed below with respect to the illustrative example.

Illustrative Example

Consider a straight flight path lifting off to 50 meters above location A, traversing 5 km, and landing at location B. The operator schedules the mission to start at 12:00. The flight faces a slight head-wind of 4 knots (2 m/s). The UV manufacturer states that the UV can accelerate at 1 $m/s^2$ vertically and 0.8 $m/s^2$ horizontally and that its maximum vertical speed is 3 m/s and air-speed 10 m/s. The flight therefore can cruise at 8 m/s ground-speed against the headwind yielding a roughly 11-minute traversal expected at its destination at 12:11. The operator, however, might not take off exactly at 12:00 and the departure may be known to, for example, slip off to as late as 12:01. The headwind may increase or decrease on the way. The manufacturer-specified speeds and accelerations carry a 5% error. Thus, the flight could actually arrive any time between 12:09 and 12:14.

Figure 4A:
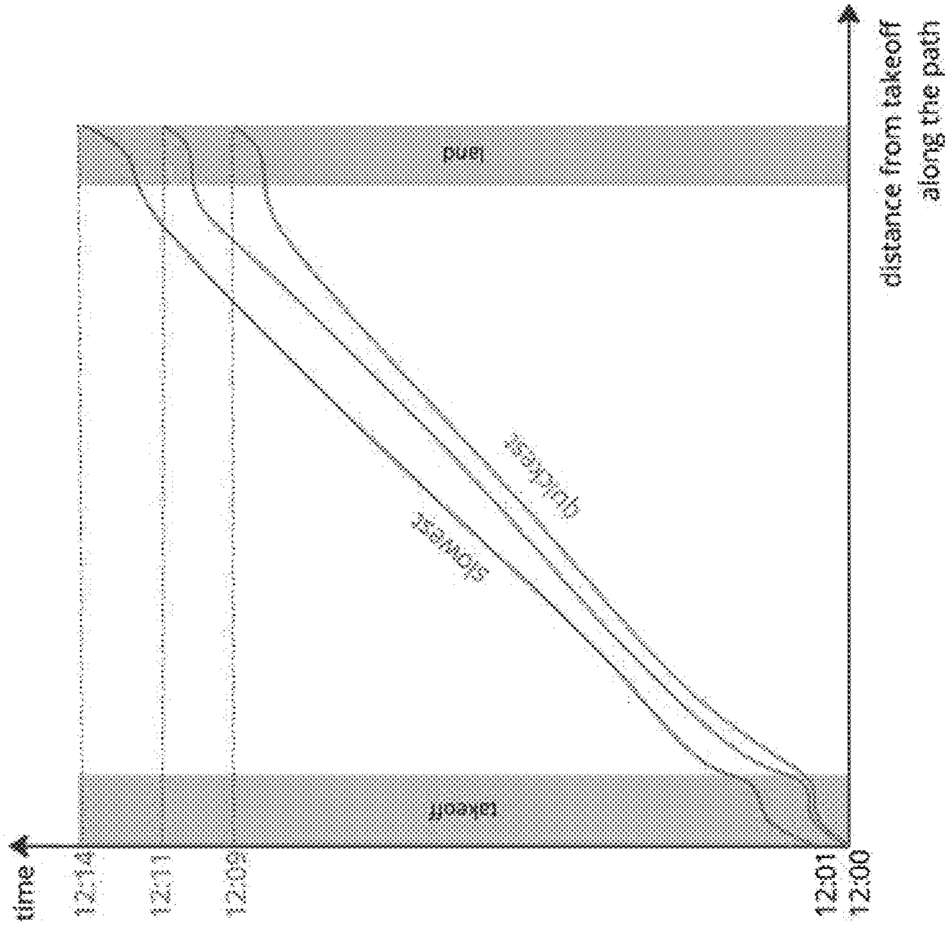
FIGS. 4A-4F illustrate an example of discretizing flight paths, according to an embodiment.

FIG. 4A illustrates a graph showing distance from a takeoff (e.g., location A) along a path to land/a destination (e.g., location B) compared to time. FIG. 4A represents time along the y-axis and distance from takeoff along the x-axis. The graph illustrates three potential scenarios, including: (1) the quickest scenario as described above where the UV could arrive as early as 12:09; (2) the slowest scenario as described above where the UV could arrive as late as 12:14; and (3) the estimated/expected scenario as described above where the UV will arrive at 12:11. In some implementations, the flight path (e.g., a flight path from flight paths 106 in FIG. 1) can represent scenarios (1) and (2) (i.e., the slowest and quickest scenarios).

Figure 4B:
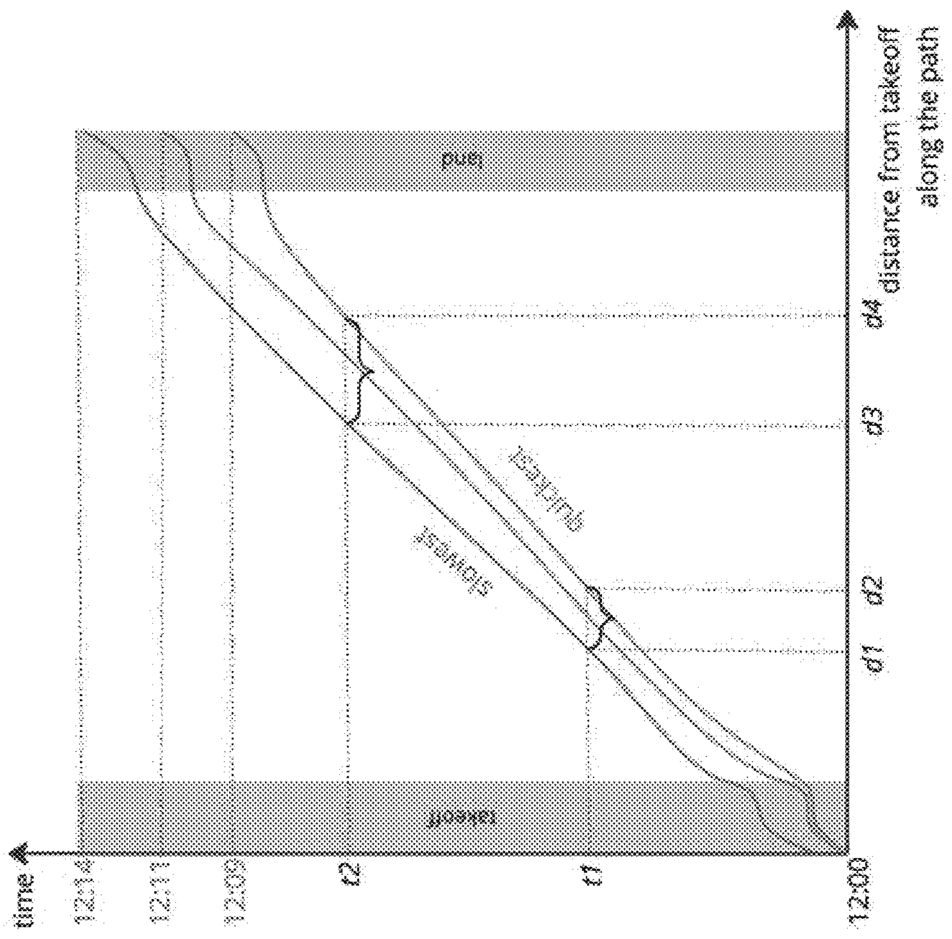

The position and time of each UV can be estimated. For example, given a flight path, scheduled start, UV performance envelope (e.g., bank angles, horizontal and vertical speeds, accelerations) all with weather and payload dependent accuracy, it is possible to (over-) estimate (e.g., with 100% probability in normal operation and without entering contingency or emergency response), the section of the path where the UV will be located in at time t. For instance, as shown in FIG. 4B, at t1 the UV will be between d1 and d2 while at t2 the UV will be between d3 and d4.

Figure 4C:
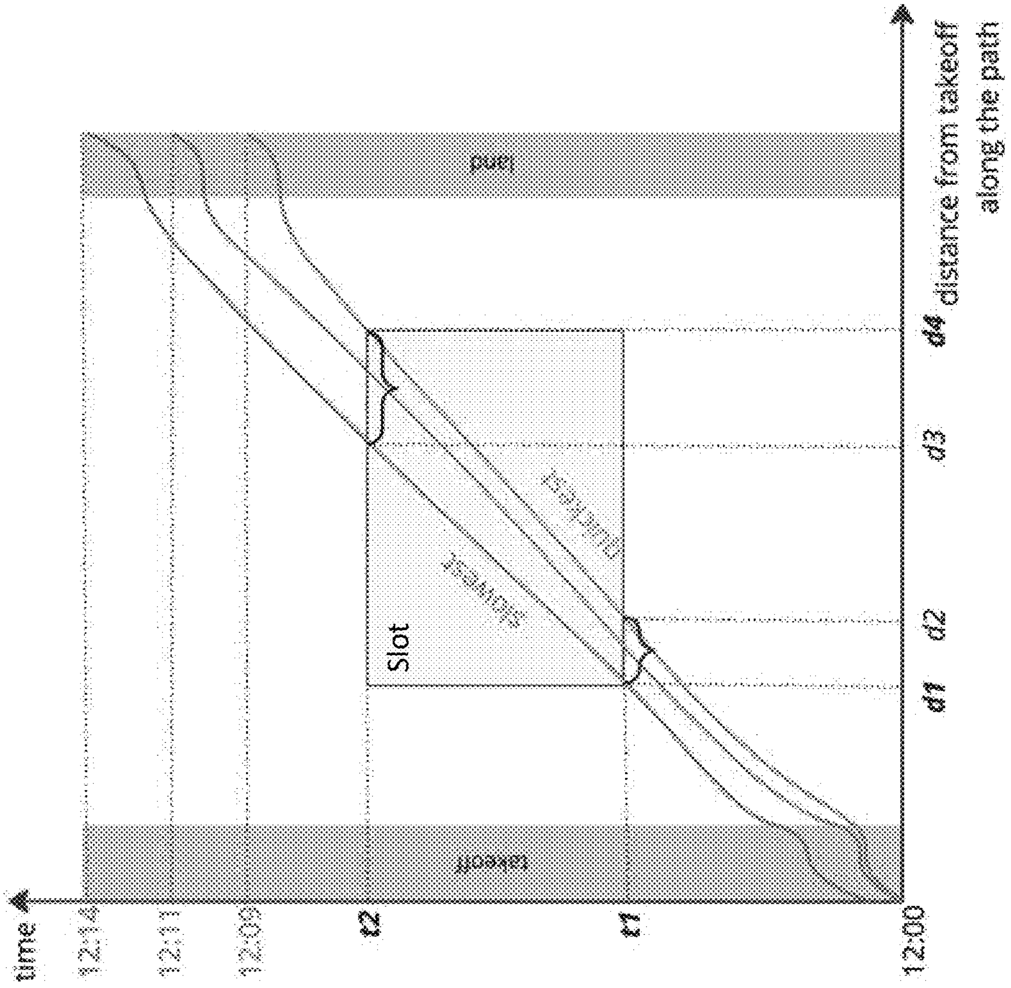
Figure 4D:
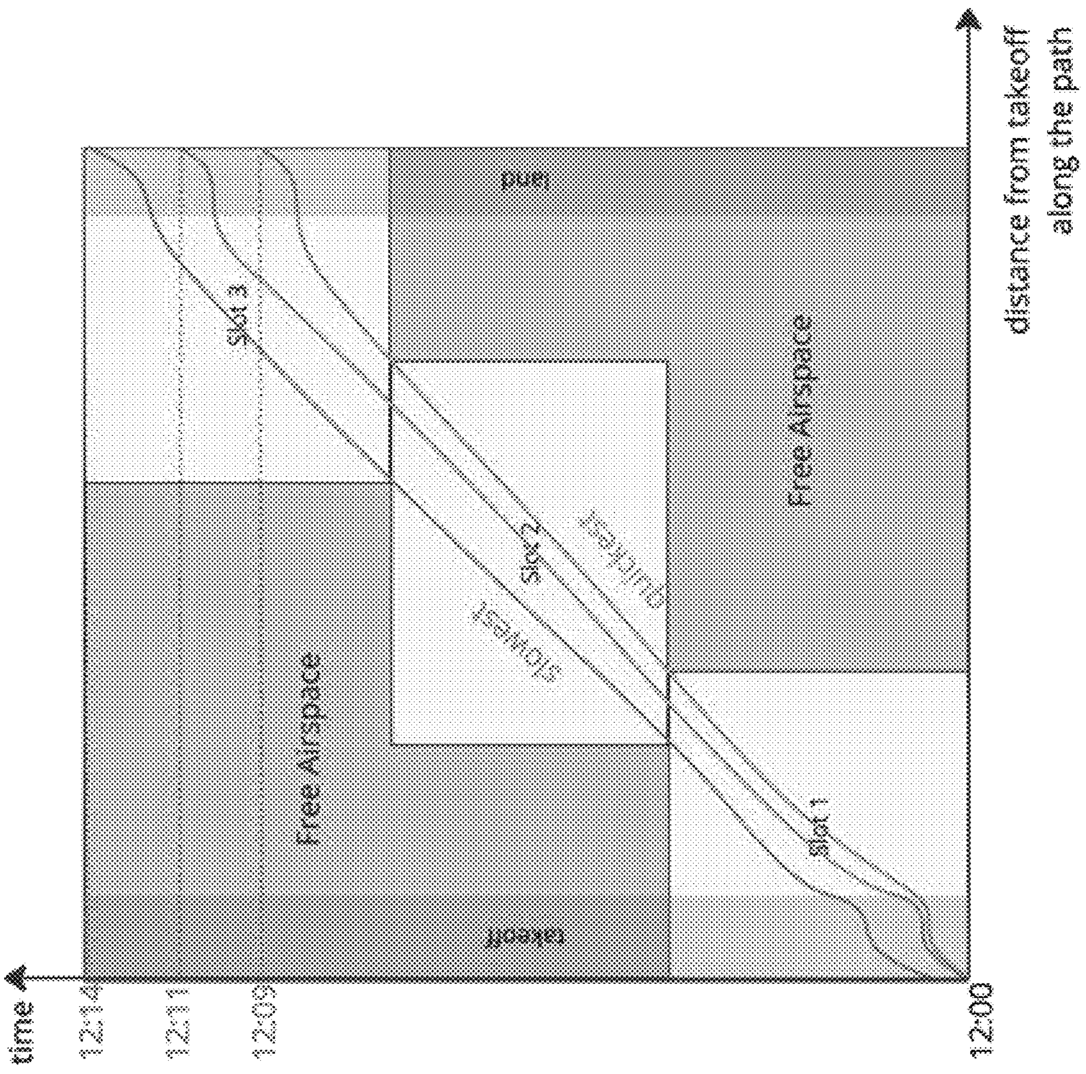
Figure 4E:
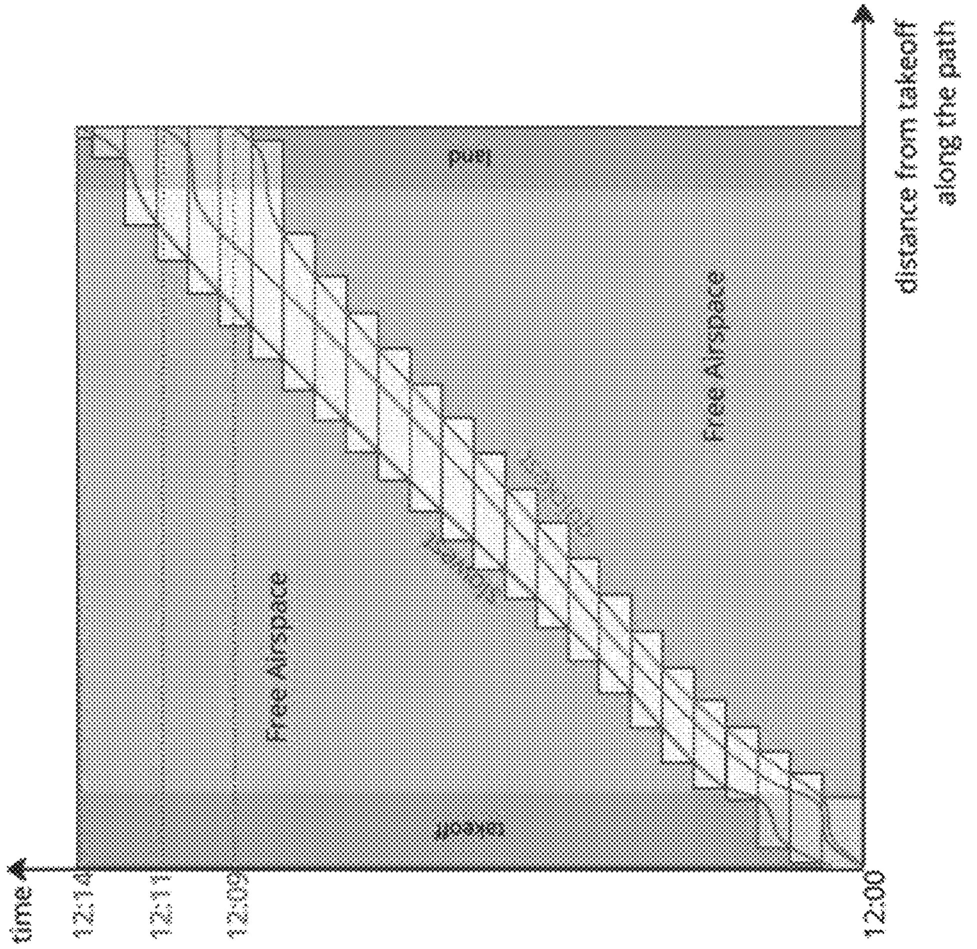
Figure 4F:
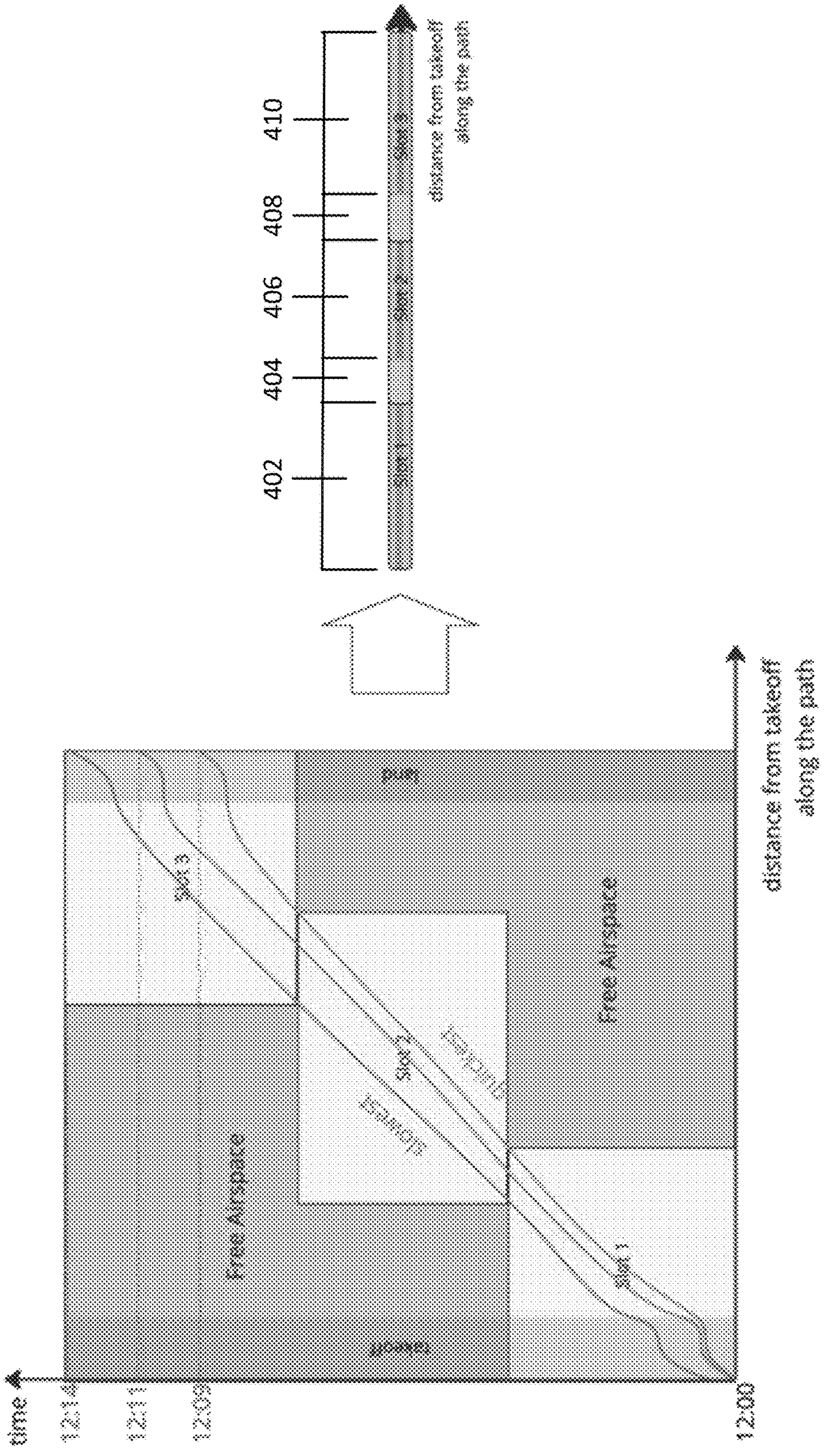

The position and time can also be discretized. For example, because the UV can move along the path and away from its origin following a continuous function, so can the estimations of this movement. In general, however, because this continuous function describe periods of, for example, acceleration, deceleration, stops, slowdowns to bank angle, winch operation, precision landing procedures, and so on it can be desirable to capture this movement by the UV by sampling into buckets (i.e., discretizing) (instead of trying to capture the UV's movement (or estimation of thereof) with a function). An example of this is shown in FIG. 4C. Note that in FIG. 4C between times t1 and t2 the vehicle will find itself on its path somewhere between d1 and d4 from the origin, which can be referred to as a "discrete flight path segment" or "slot." Multiple slots can be created along the entire flight path, as shown in FIG. 4D, which includes three different slots for a UV's flight path. Slots mark can indicate the potential presence of the UV, thus anything outside the slot can be considered, for example, free airspace available to other traffic. Any number of slots can be used. For example, as shown in FIG. 4E, the number of slots can be increased to increase (e.g., maximize) the amount of free airspace. In some implementations, all the slots for a given flight path from takeoff to landing (e.g., slots shown in FIG. 4D or 4E) refers to the discrete flight path segments associated with that flight path. In some implementations, such as if each slot is associated with substantially the same duration (e.g., each slot represents distance for one minute duration, each slot represents distance for a five-minute duration, and/or the like), a graph can be represented as a sliding window reservation; an example of this is shown in FIG. 4F, where the graph from FIG. 4D is represented as a sliding window reservation. In FIG. 4F, region 402 can represent the distances from takeoff of slot 1 that do not overlap with the distances from takeoff of slot 2, region 404 can represent the distances from takeoff of slot 1 that overlap with the distances from takeoff of slot 2, region 406 can represent the distances from takeoff of slot 2 that do not overlap with the distances from takeoff of slots 1 and 3, region 408 can represent the distances from takeoff of slot 2 that overlap with the distances from takeoff of slot 3, and region 410 can represent the distances from takeoff of slot 3 that do not overlap with the distances from takeoff of slot 2.

Figure 5A:
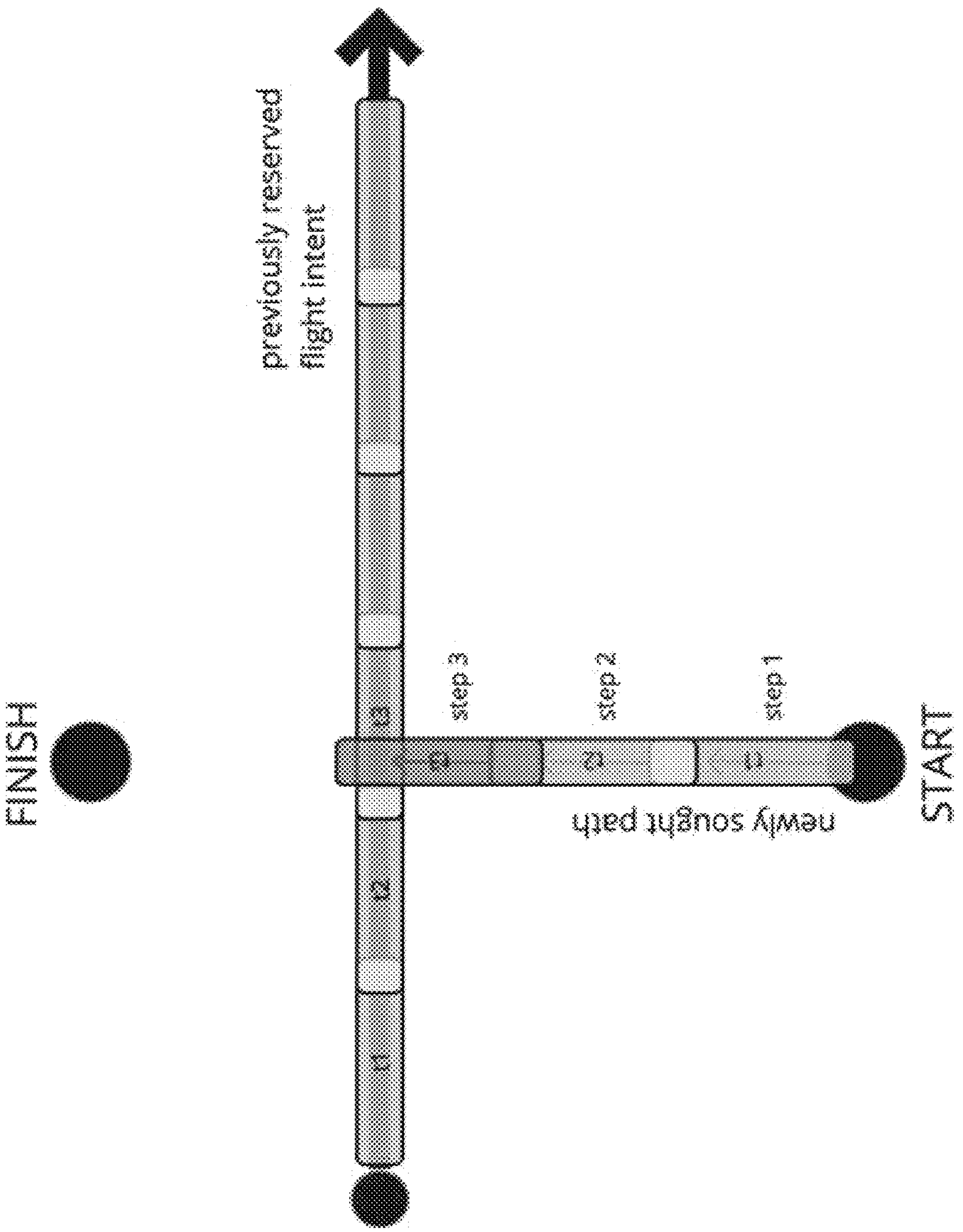
FIGS. 5A-5C illustrate resolving a conflict between two flight paths, according to an embodiment.
Figure 5B:
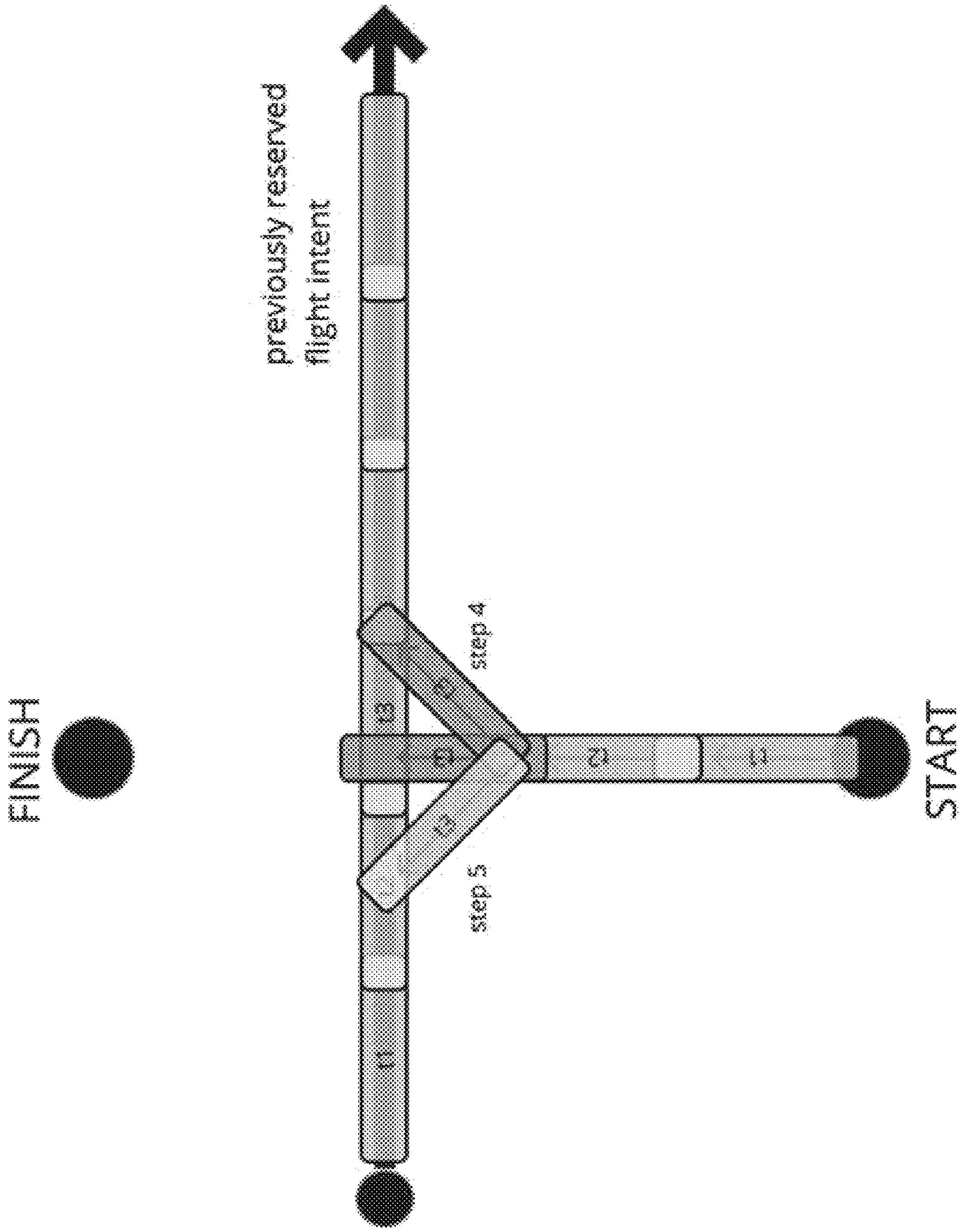
Figure 5C:
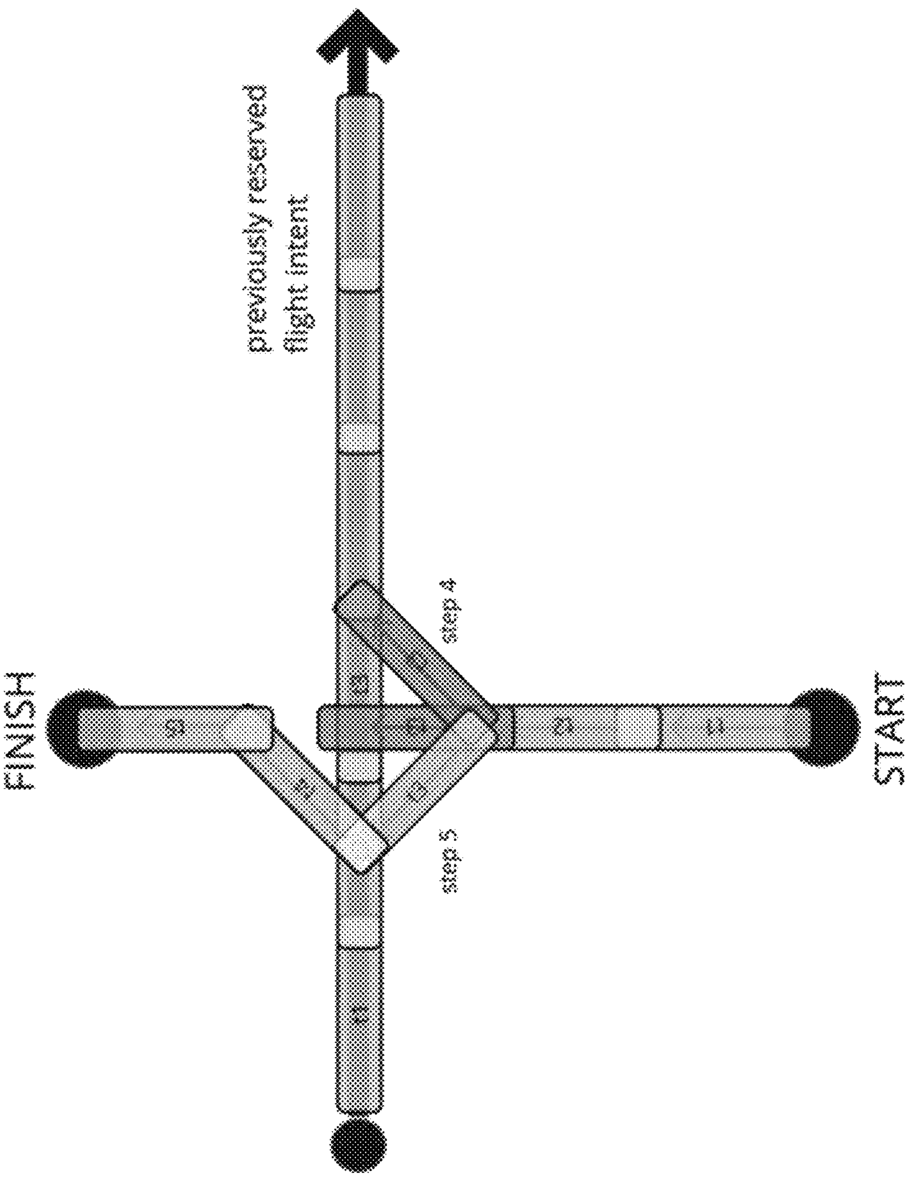

FIGS. 5A-5C illustrate resolving a conflict between two flight paths, according to an embodiment. FIG. 5A illustrates a newly sought path from a start location to a finish location, as well as a previously reserved flight intent. As shown, if UVs were to follow both the newly sought path and previously reserved flight intent, those UVs would collide (or at least be undesirably close to each other) at time t3. In other words, as shown in FIG. 5A, the slot at t3 for the newly-sought path would conflict with the previously-reserved flight path. As a result, the newly sought path can be modified. One option would be to redirect the newly sought path to the right at time t3, but as illustrated in FIG. 5B, that may still result in a conflict. Another option would be to redirect the newly sought path to the left at time t3, which, as illustrated in FIG. 5B, will not result in a conflict (because the UV for the previously reserved flight intent would have passed that location at time t2). Because redirecting to the left would not result in a conflict, that option can be chosen and the remaining flight paths can be determined to reach the finish, as illustrated in FIG. 5C.

Figure 6:
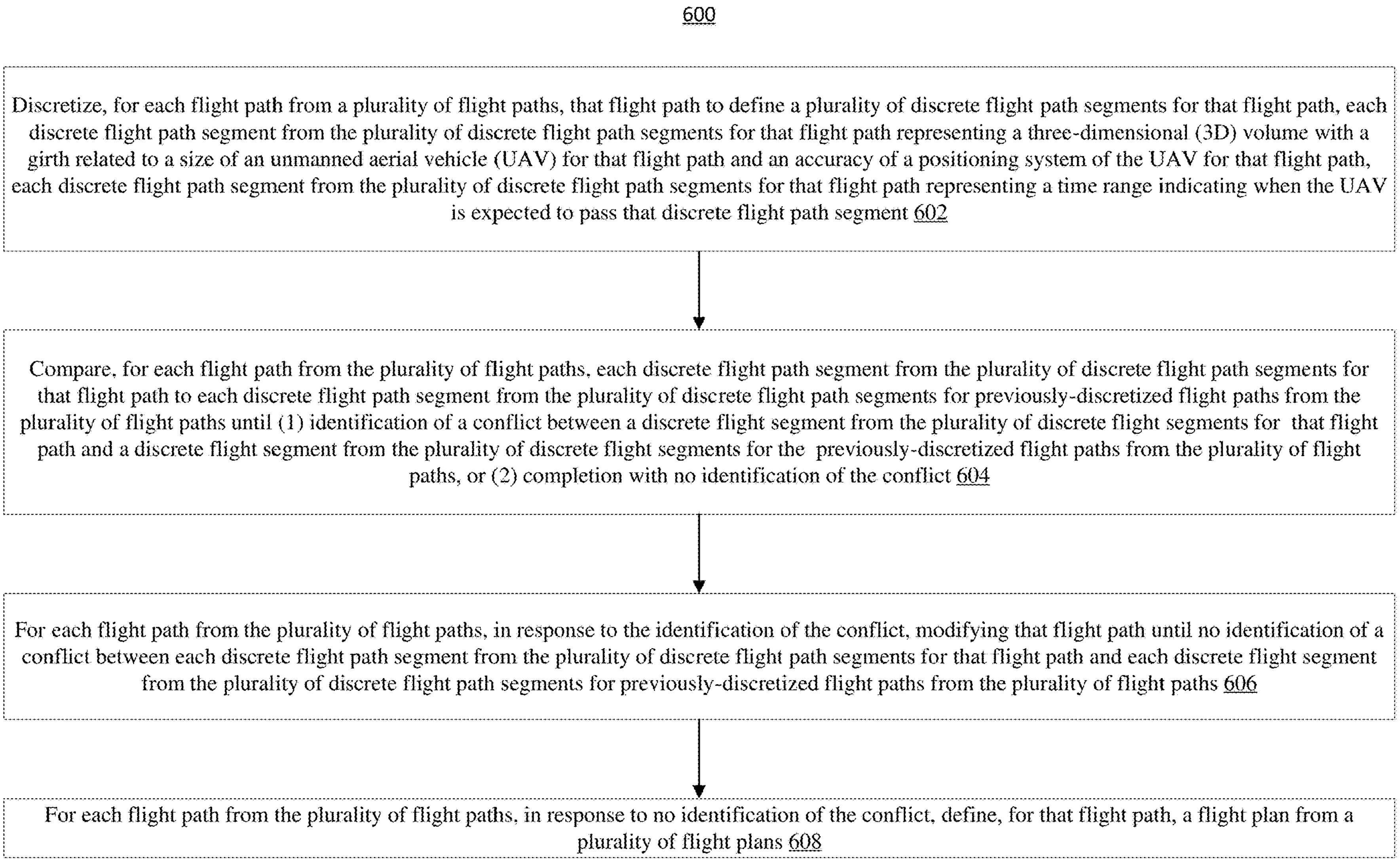
FIG. 6 shows a flowchart of a method to determine whether flight paths conflict and responding accordingly, according to an embodiment

FIG. 6 shows a flowchart of a method 600 to determine whether flight paths conflict and responding accordingly, according to an embodiment. In some implementations, method 600 is performed by a processor (e.g., processor 102).

Method 600 can be performed for each flight path from a plurality of flight paths (e.g., flight paths 106). At 602, that flight path is discretized to define a plurality of discrete flight path segments (e.g., discrete flight path segments included in discrete flight path segments 108) for that flight path. Each discrete flight path segment from the plurality of discrete flight path segments for that flight path represents a three-dimensional (3D) volume with a girth related to a size of an unmanned aerial vehicle (UAV) (e.g., included in UVs 140) for that flight path and an accuracy of a positioning system of the UAV for that flight path. Each discrete flight path segment from the plurality of discrete flight path segments for that flight path represents a time range indicating when the UAV is expected to pass that discrete flight path segment. At 604, each discrete flight path segment from the plurality of discrete flight path segments for that flight path is compared to each discrete flight path segment from the plurality of discrete flight path segments for previously-discretized flight paths (e.g., other discrete flight path segments from discrete flight path segments 108) from the plurality of flight paths until (1) identification of a conflict between a discrete flight segment from the plurality of discrete flight segments for that flight path and a discrete flight segment from the plurality of discrete flight segments for the previously-discretized flight paths from the plurality of flight paths, or (2) completion with no identification of the conflict. At 606, in response to the identification of the conflict, that flight path is modified until no identification of a conflict between each discrete flight path segment from the plurality of discrete flight path segments for that flight path and each discrete flight segment from the plurality of discrete flight path segments for previously-discretized flight paths from the plurality of flight paths. At 608, in response to no identification of the conflict, a flight plan from a plurality of flight plans is defined for that flight path.

Some implementations of method 600 further include overestimating, for each flight path from the plurality of flight paths and before discretizing, a size of the 3D volume for each discrete flight path segment from the plurality of flight path segments based on a performance envelope for the UAV for that flight path that is based on at least one of (1) a weather associated with the UAV for that flight path, (2) a vehicle configuration for the UAV for that flight path, (3) an accuracy of a measurement device associated with the UAV, (4) a type of cargo of the UAV, (5) a time buffer associated with each discrete flight segment from the plurality of discrete flight segments, and/or (6) historical data associated with performance of the UAV.

In some implementations of method 600, for each flight path from the plurality of flight paths, a number of discrete flight path segments in the plurality of discrete flight path segments for that flight path equals a number of discrete flight path segments in the plurality of discrete flight path segments for each remaining flight path in the plurality of flight paths.

In some implementations of method 600, for each flight path from the plurality of flight paths, a duration of each discrete flight path segment from the plurality of discrete flight path segments for that flight path equals a duration for each remaining discrete flight path segment from the plurality of discrete flight path segments for that flight path.

In some implementations of method 600, for each flight path from the plurality of flight paths, a distance of each discrete flight path segment from the plurality of discrete flight path segments for that flight path equals a distance for each remaining discrete flight path segment from the plurality of discrete flight path segments for that flight path.

In some implementations of method 600, at least one discrete flight path segment from the plurality of discrete flight path segments for a first flight path from the plurality of flight paths has a duration and a distance different from a duration and a distance of each remaining discrete flight path segments from the plurality of discrete flight path segments for the first flight path.

Some implementations of method 600 further include sending, to a compute device (e.g., operator compute device 160A) of a pilot (e.g., operator O1) assigned to a first UAV (e.g., UV 140A) associated with a first flight path from the plurality of flight paths and before the start time for the first UAV, a signal representing the flight plan for the first flight path. Method 600 can further include sending, to a compute device (e.g., UV 140B) of a pilot (e.g., operator O2) assigned to a second UAV (e.g., UV 140B) associated with a second flight path from the plurality of flight paths and before the start time for the second UAV, a signal representing the flight plan for the second flight path.

Figure 7:
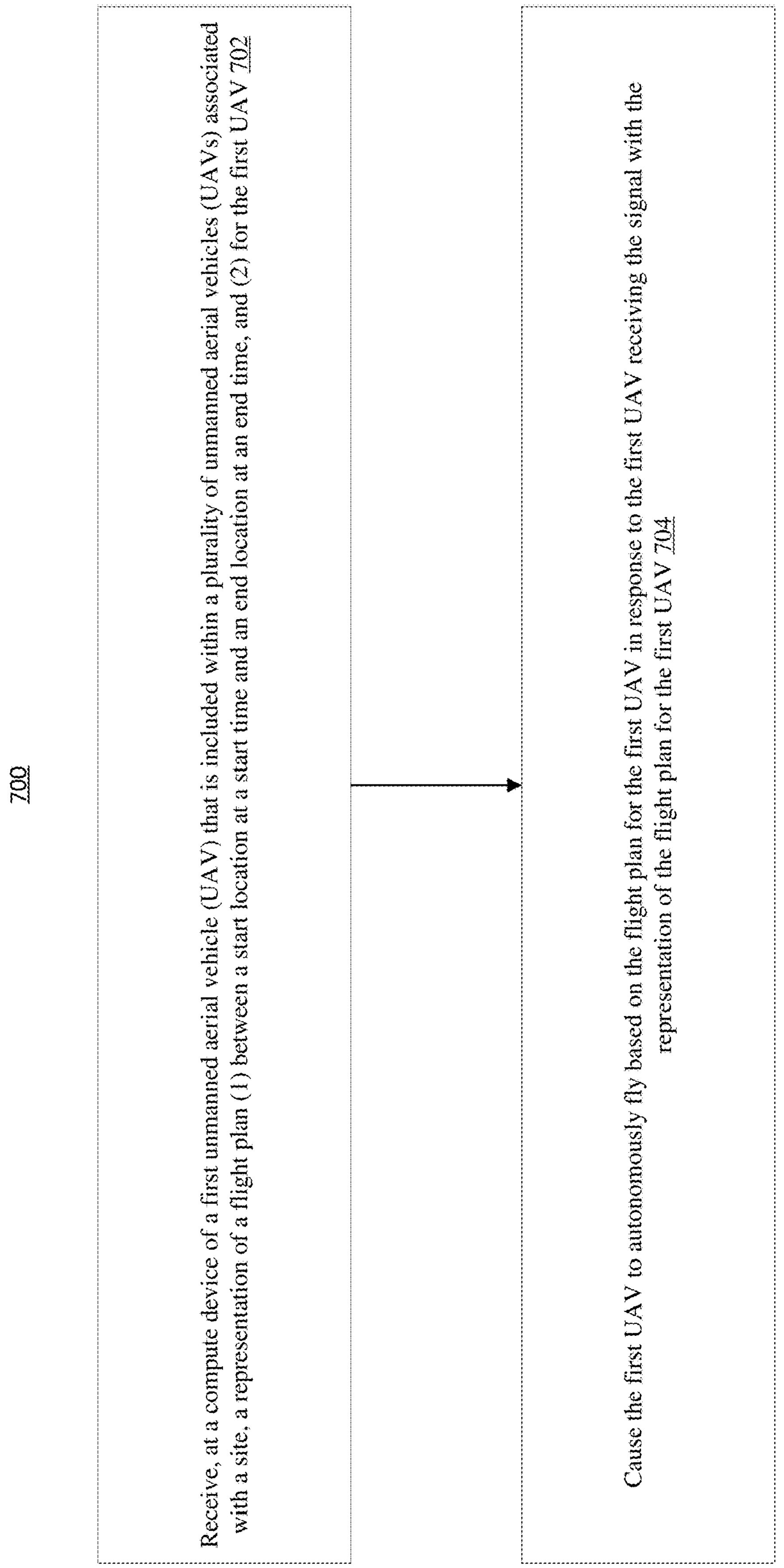
FIG. 7 shows a flowchart of a method to fly a UAV based on a flight plan, according to an embodiment.

FIG. 7 shows a flowchart of a method 700 to fly a UAV based on a flight plan, according to an embodiment. In some implementations, method 700 is performed by a processor (e.g., processor in UV 140A, processor in UV 140B).

At 702, at a compute device of a first unmanned aerial vehicle (UAV) (e.g., UV 140A or 140B) that is included within a plurality of unmanned aerial vehicles (UAVs) (e.g., UVs 140) associated with a site, a representation of a flight plan (e.g., included in flight plans 110) (1) between a start location at a start time and an end location at an end time, and (2) for the first UAV, is received. The flight plan for the first UAV can be associated with a non-linear flight path having a plurality of discrete flight segments (e.g., included in discrete flight path segments 108). Each discrete flight path segment from the plurality of discrete flight path segments for the first UAV can represent a three-dimensional (3D) volume with a girth related to a size of the first UAV and an accuracy of a positioning system of the first UAV. Each discrete flight path segment from the plurality of discrete flight path segments for that flight path can represent a time range indicating when the UAV is expected to transit through that discrete flight path segment. At least one discrete flight path segment from the plurality of discrete flight path segments for the second UAV can be modified until no identification of a conflict between each discrete flight path segment from the plurality of discrete flight path segments for the second UAV. At 704, the first UAV is caused to autonomously fly based on the flight plan for the first UAV in response to the first UAV receiving the signal with the representation of the flight plan for the first UAV.

In some implementations of method 700, a number of discrete flight path segments in the plurality of discrete flight path segments for the first UAV equals a number of discrete flight path segments in the plurality of discrete flight path segments for the second UAV.

In some implementations of method 700, a duration of each discrete flight path segment from the plurality of discrete flight path segments for the first UAV equals a duration for each remaining discrete flight path segment from the plurality of discrete flight path segments for the second UAV.

In some implementations of method 700, a distance of each discrete flight path segment from the plurality of discrete flight path segments for the first UAV equals a distance for each remaining discrete flight path segment from the plurality of discrete flight path segments for the first UAV.

In some implementations of method 700, a duration and a distance at least one discrete flight path segment from the plurality of discrete flight path segments for the first UAV is different from a duration and a distance of each remaining discrete flight path segments from the plurality of discrete flight path segments for the first UAV.

FIG. 8 shows a flowchart of a method 800 to flight plans for flight paths based on discretized flight path segments, according to an embodiment. In some implementations, method 800 is performed by a processor (e.g., processor 102).

Method 800 can be performed for each flight path from a plurality of flight paths (e.g., flight paths 106). In other words, 802, 804 and 806 are repeated for each flight path and described with respect to "that" flight path. At 802, that flight path is discretized to define a plurality of discrete flight path segments (e.g., included in discrete flight path segments 108) for that flight path. Each discrete flight path segment from the plurality of discrete flight path segments for that flight path has a three-dimensional (3D) volume for a time range. At 804, that flight path is modified until there is no identification of a conflict between each discrete flight path segment from the plurality of discrete flight path segments for that flight path and each discrete flight segment from the plurality of discrete flight path segments for previously-discretized flight paths from the plurality of flight paths. At 806, for that flight path and after the modifying, a flight plan from a plurality of flight plans (e.g., flight plans 110) and for that flight path is defined.

Some implementations of method 800 further include overestimating, for each flight path from the plurality of flight paths and before the discretizing, a size of the 3D volume for each discrete flight path segment from the plurality of discrete flight paths for that flight path based on a performance envelope for a unmanned vehicle for that flight path that is based on at least one of (1) a weather associated with that unmanned vehicle for that flight path, (2) a vehicle configuration for that unmanned vehicle, (3) an accuracy of a measurement device associated with the UAV, (4) a type of cargo of the UAV, (5) a time buffer associated with each discrete flight segment from the plurality of discrete flight segments, and/or (6) historical data associated with performance of the UAV.

Some implementations of method 800 further include sending, for each unmanned aerial vehicle from a plurality of unmanned aerial vehicles (e.g., UVs 140) associated with the plurality of flight paths and to a compute device (e.g., operator compute device 160A) of a pilot (e.g., operator O1) assigned to that unmanned aerial vehicle, a signal representing the flight plan for that unmanned aerial vehicle.

In some implementations of method 800, for each flight path from the plurality of flight paths, a number of discrete flight path segments in the plurality of discrete flight path segments for that flight path equals a number of discrete flight path segments in the plurality of discrete flight path segments for each remaining flight path in the plurality of flight paths.

In some implementations of method 800, for each flight path from the plurality of flight paths, a duration of each discrete flight path segment from the plurality of discrete flight path segments for that flight path equals a duration for each remaining discrete flight path segment from the plurality of discrete flight path segments for that flight path.

In some implementations of method 800, for each flight path from the plurality of flight paths, a distance of each discrete flight path segment from the plurality of discrete flight path segments for that flight path equals a distance for each remaining discrete flight path segment from the plurality of discrete flight path segments for that flight path.

All combinations of the foregoing concepts and additional concepts discussed here (provided such concepts are not mutually inconsistent) are contemplated as being part of the subject matter disclosed herein. The terminology explicitly employed herein that also may appear in any disclosure incorporated by reference should be accorded a meaning most consistent with the particular concepts disclosed herein.

The skilled artisan will understand that the drawings primarily are for illustrative purposes, and are not intended to limit the scope of the subject matter described herein. The drawings are not necessarily to scale; in some instances, various aspects of the subject matter disclosed herein may be shown exaggerated or enlarged in the drawings to facilitate an understanding of different features. In the drawings, like reference characters generally refer to like features (e.g., functionally similar and/or structurally similar elements).

To address various issues and advance the art, the entirety of this application (including the Cover Page, Title, Headings, Background, Summary, Brief Description of the Drawings, Detailed Description, Embodiments, Abstract, Figures, Appendices, and otherwise) shows, by way of illustration, various embodiments in which the embodiments may be practiced. The advantages and features of the application are of a representative sample of embodiments only, and are not exhaustive and/or exclusive. Rather, they are presented to assist in understanding and teach the embodiments, and are not representative of all embodiments. As such, certain aspects of the disclosure have not been discussed herein. That alternate embodiments may not have been presented for a specific portion of the innovations or that further undescribed alternate embodiments may be available for a portion is not to be considered to exclude such alternate embodiments from the scope of the disclosure. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure.

Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure.

Various concepts may be embodied as one or more methods, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments. Put differently, it is to be understood that such features may not necessarily be limited to a particular order of execution, but rather, any number of threads, processes, services, servers, and/or the like that may execute serially, asynchronously, concurrently, in parallel, simultaneously, synchronously, and/or the like in a manner consistent with the disclosure. As such, some of these features may be mutually contradictory, in that they cannot be simultaneously present in a single embodiment. Similarly, some features are applicable to one aspect of the innovations, and inapplicable to others.

In addition, the disclosure may include other innovations not presently described. Applicant reserves all rights in such innovations, including the right to embodiment such innovations, file additional applications, continuations, continuations-in-part, divisionals, and/or the like thereof. As such, it should be understood that advantages, embodiments, examples, functional, features, logical, operational, organizational, structural, topological, and/or other aspects of the disclosure are not to be considered limitations on the disclosure as defined by the embodiments or limitations on equivalents to the embodiments. Depending on the particular desires and/or characteristics of an individual and/or enterprise user, database configuration and/or relational model, data type, data transmission and/or network framework, syntax structure, and/or the like, various embodiments of the technology disclosed herein may be implemented in a manner that enables a great deal of flexibility and customization as described herein.

All definitions, as defined and used herein, should be understood to control over dictionary definitions, definitions in documents incorporated by reference, and/or ordinary meanings of the defined terms.

As used herein, in particular embodiments and unless stated otherwise, the terms “about” “substantially” or “approximately” when preceding a numerical value indicates the value plus or minus a range of 10%. Where a range of values is provided, it is understood that each intervening value, to the tenth of the unit of the lower limit unless the context clearly dictates otherwise, between the upper and lower limit of that range and any other stated or intervening value in that stated range is encompassed within the disclosure. That the upper and lower limits of these smaller ranges can independently be included in the smaller ranges is also encompassed within the disclosure, subject to any specifically excluded limit in the stated range. Where the stated range includes one or both of the limits, ranges excluding either or both of those included limits are also included in the disclosure.

The indefinite articles “a” and “an,” as used herein in the specification and in the embodiments, unless clearly indicated to the contrary, should be understood to mean “at least one.”

The phrase “and/or,” as used herein in the specification and in the embodiments, should be understood to mean “either or both” of the elements so conjoined, i.e., elements that are conjunctively present in some cases and disjunctively present in other cases. Multiple elements listed with “and/or” should be construed in the same fashion, i.e., “one or more” of the elements so conjoined. Other elements may optionally be present other than the elements specifically identified by the “and/or” clause, whether related or unrelated to those elements specifically identified. Thus, as a non-limiting example, a reference to “A and/or B”, when used in conjunction with open-ended language such as “comprising” can refer, in one embodiment, to A only (optionally including elements other than B); in another embodiment, to B only (optionally including elements other than A); in yet another embodiment, to both A and B (optionally including other elements); etc.

As used herein in the specification and in the embodiments, “or” should be understood to have the same meaning as “and/or” as defined above. For example, when separating items in a list, “or” or “and/or” shall be interpreted as being inclusive, i.e., the inclusion of at least one, but also including more than one, of a number or list of elements, and, optionally, additional unlisted items. Only terms clearly indicated to the contrary, such as “only one of” or “exactly one of," or, when used in the embodiments, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the embodiments, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

Some embodiments and/or methods described herein can be performed by software (executed on hardware), hardware, or a combination thereof. Hardware modules may include, for example, a processor, a field programmable gate array (FPGA), and/or an application specific integrated circuit (ASIC). Software modules (executed on hardware) can include instructions stored in a memory that is operably coupled to a processor, and can be expressed in a variety of software languages (e.g., computer code), including C, C++, Java™ Ruby, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

The term "processor" should be interpreted broadly to encompass a general purpose processor, a central processing unit (CPU), a microprocessor, a digital signal processor (DSP), a controller, a microcontroller, a state machine and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

While specific embodiments of the present disclosure have been outlined above, many alternatives, modifications, and variations will be apparent to those skilled in the art. Accordingly, the embodiments set forth herein are intended to be illustrative, not limiting. Various changes may be made without departing from the spirit and scope of the disclosure.

The invention claimed is:

1. A non-transitory processor-readable medium storing code representing instructions to be executed by a processor, the instructions comprising code to cause the processor to:

for each flight path (1) from a plurality of flight paths and (2) for an unmanned aerial vehicle (UAV) from a plurality of UAVs, discretize that flight path to define a plurality of discrete flight path segments for that flight path, each discrete flight path segment from the plurality of discrete flight path segments for that flight path representing a three-dimensional (3D) volume with (1) a girth related to a size of the UAV for that flight path and from the plurality of UAVs and (2) an accuracy of a positioning system of the UAV for that flight path and from the plurality of UAVs, each discrete flight path segment from the plurality of discrete flight path segments for that flight path representing a time range indicating when the UAV is expected to pass that discrete flight path segment;

compare each discrete flight path segment from the plurality of discrete flight path segments for that flight path to each discrete flight path segment from the plurality of discrete flight path segments for previously-discretized flight paths from the plurality of flight paths until (1) identification of a conflict between a discrete flight segment from the plurality of discrete flight segments for that flight path and a discrete flight segment from the plurality of discrete flight segments for the previously-discretized flight paths from the plurality of flight paths, or (2) completion with no identification of the conflict;

in response to the identification of the conflict, modifying that flight path and not previously-discretized flight paths from the plurality of flight paths until no identification of a conflict between each discrete flight path segment from the plurality of discrete flight path segments for that flight path and each discrete flight segment from the plurality of discrete flight path segments for previously-discretized flight paths from the plurality of flight paths; and in response to no identification of the conflict, define, for that flight path, a flight plan from a plurality of flight plans; and sending, for each UAV from the plurality of UAVs, the flight plan for that UAV and from the plurality of flight plans for that UAV to autonomously fly based on the flight plan for that UAV after receiving the flight plan for that UAV.

2. The non-transitory processor-readable medium of claim 1, wherein the instructions further comprise code to cause the processor to:

overestimate, for each flight path from the plurality of flight paths and before discretizing, a size of the 3D volume for each discrete flight path segment from the plurality of flight path segments based on a performance envelope for the UAV for that flight path that is based on at least one of (1) a weather associated with the UAV for that flight path, (2) a vehicle configuration for the UAV for that flight path, (3) an accuracy of a measurement device associated with the UAV, (4) a type of cargo of the UAV, (5) a time buffer associated with each discrete flight segment from the plurality of discrete flight segments, or (6) historical data associated with performance of the UAV.

3. The non-transitory processor-readable medium of claim 1, wherein, for each flight path from the plurality of flight paths, a number of discrete flight path segments in the plurality of discrete flight path segments for that flight path equals a number of discrete flight path segments in the plurality of discrete flight path segments for each remaining flight path in the plurality of flight paths.

4. The non-transitory processor-readable medium of claim 1, wherein, for each flight path from the plurality of flight paths, a duration of each discrete flight path segment from the plurality of discrete flight path segments for that flight path equals a duration for each remaining discrete flight path segment from the plurality of discrete flight path segments for that flight path.

5. The non-transitory processor-readable medium of claim 1, wherein, for each flight path from the plurality of flight paths, a distance of each discrete flight path segment from the plurality of discrete flight path segments for that flight path equals a distance for each remaining discrete flight path segment from the plurality of discrete flight path segments for that flight path.

6. The non-transitory processor-readable medium of claim 1, wherein:

at least one discrete flight path segment from the plurality of discrete flight path segments for a first flight path from the plurality of flight paths has a duration and a distance different from a duration and a distance of each remaining discrete flight path segments from the plurality of discrete flight path segments for the first flight path.

7. The non-transitory processor-readable medium of claim 1, wherein the instructions further comprise code to cause the processor to:

send, to a compute device of a pilot assigned to a first UAV associated with a first flight path from the plurality of flight paths and before a start time for the first UAV, a signal representing the flight plan for the first flight path; and send, to a compute device of a pilot assigned to a second UAV associated with a second flight path from the plurality of flight paths and before a start time for the second UAV, a signal representing the flight plan for the second flight path.

8. A method, comprising:

receiving, at a compute device of a first unmanned aerial vehicle (UAV) that is included within a plurality of unmanned aerial vehicles (UAVs) associated with a site, a signal with a representation of a flight plan (1) between a start location at a start time and an end location at an end time, and (2) for the first UAV, the flight plan for the first UAV being associated with a non-linear flight path having a plurality of discrete flight segments, each discrete flight path segment from the plurality of discrete flight path segments for the first UAV representing a three-dimensional (3D) volume with a girth related to a size of the first UAV and an accuracy of a positioning system of the first UAV, each discrete flight path segment from the plurality of discrete flight path segments for that flight path representing a time range indicating when the first UAV is expected to pass that discrete flight path segment, at least one discrete flight path segment from the plurality of discrete flight path segments for the first UAV having been modified without previously-discretized flight paths having been modified until no identification of a conflict between each previously-discretized flight path segment from the plurality of previously-discretized flight path segments for a second UAV from the plurality of UAVs; and causing the first UAV to autonomously fly based on the flight plan for the first UAV in response to the first UAV receiving the signal with the representation of the flight plan for the first UAV.

9. The method of claim 8, wherein a number of discrete flight path segments in the plurality of discrete flight path segments for the first UAV equals a number of discrete flight path segments in the plurality of discrete flight path segments for the second UAV.

10. The method of claim 8, wherein a duration of each discrete flight path segment from the plurality of discrete flight path segments for the first UAV equals a duration for each remaining discrete flight path segment from the plurality of discrete flight path segments for the second UAV.

11. The method of claim 8, wherein a distance of each discrete flight path segment from the plurality of discrete flight path segments for the first UAV equals a distance for each remaining discrete flight path segment from the plurality of discrete flight path segments for the first UAV.

12. The method of claim 8, wherein a duration and a distance at least one discrete flight path segment from the plurality of discrete flight path segments for the first UAV is different from a duration and a distance of each remaining discrete flight path segments from the plurality of discrete flight path segments for the first UAV.

13. An apparatus, comprising:

a processor; and a memory coupled to the processor, the memory storing code that when executed by the processor cause the processor to:

for each flight path from a plurality of flight paths:

discretize that flight path to define a plurality of discrete flight path segments for that flight path, each discrete flight path segment from the plurality of discrete flight path segments for that flight path having a three-dimensional (3D) volume for a time range; and modify that flight path and not previously-discretized flight paths from the plurality of flight paths until no identification of a conflict between each discrete flight path segment from the plurality of discrete flight path segments for that flight path and each discrete flight segment from the plurality of discrete flight path segments for previously-discretized flight paths from the plurality of flight paths; and define, for that flight path and after the modifying, a flight plan from a plurality of flight plans and for that flight path; and send a flight plan from the plurality of flight plans to an unmanned aerial vehicle (UAV) associated with that flight plan and from a plurality of UAVs for the UAV to autonomously fly based on the flight plan for the UAV after receiving the flight plan for the UAV.

14. The apparatus of claim 13, wherein the memory storing code that when executed by the processor further cause the processor to:

overestimate, for each flight path from the plurality of flight paths and before the discretizing, a size of the 3D volume for each discrete flight path segment from the plurality of discrete flight paths for that flight path based on a performance envelope for an unmanned vehicle (UAV) for that flight path that is based on at least one of (1) a weather associated with that unmanned vehicle for that flight path, (2) a vehicle configuration for that unmanned vehicle, (3) an accuracy of a measurement device associated with the UAV, (4) a type of cargo of the UAV, (5) a time buffer associated with each discrete flight segment from the plurality of discrete flight segments, or (6) historical data associated with performance of the UAV.

15. The apparatus of claim 13, the memory storing code that when executed by the processor further cause the processor to:

send, for each unmanned aerial vehicle from a plurality of unmanned aerial vehicles associated with the plurality of flight paths and to a compute device of a pilot assigned to that unmanned aerial vehicle, a signal representing the flight plan for that unmanned aerial vehicle.

16. The apparatus of claim 13, wherein, for each flight path from the plurality of flight paths, a number of discrete flight path segments in the plurality of discrete flight path segments for that flight path equals a number of discrete flight path segments in the plurality of discrete flight path segments for each remaining flight path in the plurality of flight paths.

17. The apparatus of claim 13, wherein, for each flight path from the plurality of flight paths, a duration of each discrete flight path segment from the plurality of discrete flight path segments for that flight path equals a duration for each remaining discrete flight path segment from the plurality of discrete flight path segments for that flight path.

18. The apparatus of claim 13, wherein, for each flight path from the plurality of flight paths, a distance of each discrete flight path segment from the plurality of discrete flight path segments for that flight path equals a distance for each remaining discrete flight path segment from the plurality of discrete flight path segments for that flight path.

19. The apparatus of claim 13, wherein, for each flight path from a plurality of flight paths, that flight path is generated based on at least one of a shortest path, a fastest path, a combination of the shortest path and the fastest path, or energy expended between a start location associated with that flight path and an end location associated with that flight path.

20. The apparatus of claim 19, wherein the shortest path is a path between the start location and the end location.

21. The apparatus of claim 13, wherein each flight plan from the plurality of flight plans is associated with an unmanned aerial vehicle (UAV) from a plurality of UAVs and includes indication of at least one of (1) an estimated time en route for the UAV associated with that flight plan, (2) an alternative landing location in case of an emergency, (3) a cargo delivered or services performed by the UAV associated with that flight plan, or (4) information identifying the UAV associated with that flight plan.

* * * * *